(12) United States Patent
Tomioka

(10) Patent No.: US 7,271,942 B2
(45) Date of Patent: Sep. 18, 2007

(54) MULTI-BEAM OPTICAL SCANNING APPARATUS AND IMAGE FORMING APPARATUS USING THE SAME

(75) Inventor: Yuichi Tomioka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 256 days.

(21) Appl. No.: 11/138,479

(22) Filed: May 27, 2005

(65) Prior Publication Data
US 2005/0280693 A1    Dec. 22, 2005

(30) Foreign Application Priority Data
Jun. 2, 2004    (JP)    ............... 2004-164643

(51) Int. Cl.
*G02B 26/08*    (2006.01)
(52) U.S. Cl. .................. 359/204; 359/216; 347/233
(58) Field of Classification Search ................ 359/204, 359/216; 347/233, 239
See application file for complete search history.

(56) References Cited
U.S. PATENT DOCUMENTS
2003/0147059 A1 *   8/2003   Tokuda et al. ................. 355/53

FOREIGN PATENT DOCUMENTS
JP    9-197316    7/1997
JP    11-218702    8/1999

\* cited by examiner

*Primary Examiner*—Euncha P. Cherry
(74) *Attorney, Agent, or Firm*—Fitzpatrick, Cella, Harper & Scinto

(57) ABSTRACT

Provided is a multi-beam optical scanning apparatus, which is capable of reducing an inter-light-beams illuminance difference at the same image height on a surface to be scanned and forming a high-definition and high-quality image where no unevenness in density of image exists, and an image forming apparatus using the multi-beam optical scanning apparatus.

In the multi-beam optical scanning apparatus that brings a plurality of light beams emitted from the plurality of light emission portions into incident on the deflecting surface of the light deflector so as to exceed a width in a main scanning direction of the deflecting surface, when performing the emission light amount control for each of the plurality of light emission portions so that illuminances of the plurality of light beams become same at every image height on the surface to be scanned, the control means changes emission light amounts of the plurality of light emission portions at a maximum scanning angle, thereby reducing the inter-light-beams illuminance difference on the surface to be scanned.

13 Claims, 16 Drawing Sheets

MULTI-BEAM OPTICAL SCANNING APPARATUS AND IMAGE FORMING APPARATUS USING THE SAME

BACKGROUND OF THE INVENTION

1. Field of the Invention

The present invention relates to a multi-beam optical scanning apparatus and an image forming apparatus using the multi-beam optical scanning apparatus. In particular, the present invention relates to a technique suited for an image forming apparatus, such as a laser beam printer using an electrophotographic process, a digital copying machine, or a multifunctional printer (versatile printer), where image information is recorded by deflecting multiple light beams emitted from light source means having multiple light emission portions using a rotation polygon mirror (polygon mirror) serving as a light deflector and then optically scanning a surface to be scanned through an imaging optical system having fθ characteristics (imaging optical system).

2. Related Background Art

Conventionally, in an optical scanning apparatus, a light flux (light beam) optically modulated and emitted from light source means in accordance with an image signal, then the light beam is periodically deflecting by a light deflector composed of a rotation polygon mirror or the like, the deflected light beam is condensed in a spot manner on a photosensitive recording medium surface by an imaging optical system having fθ characteristics, and the surface is scanned with the condensed light beam, to thereby record an image.

In recent years, along with speedup and miniaturization of an apparatus such as a laser beam printer, a digital copying machine, or a multifunctional printer, further speedup and miniaturization of an imaging optical system used as an optical system have been desired.

As a method of achieving the speedup, an overfilled optical system is used, for instance.

In the overfilled optical system (hereinafter referred to as the "OFS"), it is sufficient that a deflecting surface (reflecting surface) of a rotation polygon mirror covers a light beam width substantially required for deflection and scanning in a wide width of an incident light beam, which leads to a feature that it is possible to increase the number of surfaces of the rotation polygon mirror with a small diameter, which is suited for the speedup.

In the OFS, the incident light beam onto the rotation polygon mirror is Gaussian-distributed so that its light intensity shows the maximum in proximity to the optical axis of a condensing optical system, and a reflecting and deflecting region changes along with a field angle from the vicinity of the optical axis to an end portion, so there is a tendency that illuminance on a surface to be scanned is decreased as an image height is increased.

In addition, a fact that the light beam width in the main scanning direction of the reflected and deflected light beam decreases as the field angle increases in the OFS strengthens the tendency that the illuminance on the surface to be scanned decreases as the image height increases. An illuminance distribution on the surface to be scanned in this case is shown in FIG. 12. As can be seen from FIG. 12, in an imaging optical system using the OFS, there is a tendency that the illuminance on the surface to be scanned decreases as the image height increases (hereinafter referred to as the "light amount decreasing").

In addition, an illuminance distribution on a surface to be scanned in a case where a position, at which a light intensity of an incident light beam is the maximum on a deflecting surface, is shifted from a center of an effective light beam width in the main scanning direction of the deflecting surface to an end of the effective light beam width due to an error of installation of light source means or the like is shown in FIG. 13. As can be seen from FIG. 13, in addition to the light amount decreasing, there is a tendency that the illuminance on the surface to be scanned increases and decreases along with changes of the image height (from $-Y_0$ to $+Y_0$).

As described above, unevenness in illuminance occurs in one scanning line on a surface to be scanned, which results in a problem that when the OFS is applied to an image forming apparatus, unevenness in density of image occurs to a formed image.

In addition, in the case of a multi-beam OFS where the OFS is used as a means for achieving further speedup and simultaneously scans a surface to be scanned with light beams from multiple light emission portions onto the surface to be scanned so that the light beams are arranged side by side in a direction perpendicular to a scanning direction, at the time of formation of images having the same pattern, in addition to nonuniformity in illuminance in one scanning line on a surface to be scanned, an illuminance difference (hereinafter referred to as the "inter-beams illuminance difference") occurs among multiple beams at the same image height, so there is a problem in that unevenness in density of image occurs to a formed image.

Hereinafter, a principle of occurrence of an illuminance difference between two light beams at the same image height will be described.

A multi-beam optical scanning apparatus is a system to speed up recording of image information by simultaneously scanning a surface to be scanned with multiple light beams emitted from light source means including multiple light emission portions onto the surface to be scanned. As an example of the light source means used in this case, a multi-beam semiconductor laser will be described with reference to FIG. 14. FIG. 14 is a main portion schematic diagram of a monolithic multi-beam semiconductor laser including two light emission portions (lasers) 14a and 14b. Note that the light emission portion 14a will also be referred to as the "laser A" (or the "light emission portion A") and the light emission portion 14b will also be referred to as the "laser B" (or the "light emission portion B").

As shown in FIG. 14, a multi-beam semiconductor laser 1 includes two light emission portions 14a and 14b on one active layer 13 and a divergent light beam is emitted from each of the two light emission portions 14a and 14b. The intensity of the divergent light beam is in Gaussian-distribution so that the light intensity is the maximum at its corresponding intensity center line 14ap or 14bp. As shown in FIG. 14, in the actually manufactured multi-beam semiconductor laser 1, a difference exists between directions of the intensity center lines 14ap and 14bp of the light beams emitted from the two light emission portions 14a and 14b and an angle difference RΔθ in the main scanning direction occurs between the intensity center lines 14ap and 14bp of the light beams emitted from the two light emission portions 14a and 14b.

FIG. 15 is a main portion sectional view (main scanning sectional view) taken in a main scanning direction of a multi-OFS where the multi-beam semiconductor laser shown in FIG. 14 is used as light source means.

In the drawing, an incident optical system is illustrated as one condensing optical system 11. Also, in the drawing, an angle difference between intensity center lines 14ap and 14bp of two light beams in the main scanning direction is illustrated as RΔθ.

In the drawing, at the time of passage of the two light beams through the condensing optical system 11, intensity center lines 14ap and 14bp of the two light beams having the angle difference RΔθ pass at different heights from an optical axis 12 of the condensing optical system 11, so an interval di with respect to the main scanning direction occurs between the intensity center positions 14ap and 14bp of the two light beams in proximity to a deflecting surface 7.

As a result, the two light beams incident on the deflecting surface 7 have mutually different intensity distributions in the main scanning direction, so the illuminance distributions of the two light beams on the surface to be scanned with respect to an image height also differ from each other. This is shown in FIG. 16.

FIG. 16 illustrates illuminance distributions 14ai and 14bi of the respective light beams emitted from the two light emission portions 14a and 14bi n the case where the amounts of the lights emitted from the two light emission portions 14a and 14b are controlled so as to be equal to each other and constant at every image height for the sake of formation of images having the same pattern. It can be seen from the drawing that in addition to the tendency that the illuminance on the surface to be scanned decreases as the image height increases, an illuminance difference occurs between the two light beams at the same image height.

Various multi-beam optical scanning apparatuses and optical scanning apparatuses solving this problem are proposed (see Japanese Patent Application Laid-Open Nos. H11-218702 and H09-197316).

In Japanese Patent Application Laid-Open No. H11-218702, a configuration is disclosed in which illuminance in one scanning line on a surface to be scanned is made approximately uniform by configuring an opening shape of an opening plate, disposed in an optical path between light source means and deflecting means, wider in a sub-scanning direction than a center portion in a main scanning direction.

In Japanese Patent Application Laid-Open No. H09-197316, a configuration is disclosed in which illuminance in one scanning line on a surface to be scanned is made approximately uniform by supplying a semiconductor laser drive current based on a correction coefficient in accordance with a scanning position so as to approximately uniformize the illuminance in one scanning line on the surface to be scanned.

However, in the multi-beam optical scanning apparatuses proposed in Japanese Patent Application Laid-Open Nos. H11-218702 and H09-197316, it is difficult to reduce the inter-light-beams illuminance difference.

For instance, in Japanese Patent Application Laid-Open No. H11-218702, a configuration is disclosed in which nonuniformity in a light amount distribution is suppressed through adjustment of the opening shape of the opening plate with respect to one light beam. FIG. 17 shows an illuminance distribution in the case where the technique disclosed in Japanese Patent Application Laid-Open No. H11-218702 is applied to a multi-OFS, such as the OFS shown in FIG. 15, in which intensity center lines of two light beams have an angle difference RΔθ in a main scanning direction. As can be seen from FIG. 17, although the light amount decreasing of both of the two light beams reduces by passing of the two light beams through the opening plate having the opening shape whose width in the sub-scanning direction is wider than the center portion in the main scanning direction, it is impossible to suppress a light amount difference between the two light beams at the same image height.

Japanese Patent Application Laid-Open No. H09-197316 discloses an embodiment in which an illuminance distribution in one scanning line on a surface to be scanned of one laser is detected to calculate a correction coefficient to uniformly correct illuminance in one scanning line, and every laser drive current is supplied based on the correction coefficient illuminance distributions 14ai and 14bi are shown in FIG. 18, in the case where with respect to a multi-OFS, such as the OFS shown in FIG. 15, in which intensity center lines 14ap and 14bp of two light beams has an angle difference RΔθ in the main scanning direction, an illuminance distribution in one scanning line on a surface to be scanned of a laser A (light emission portion 14a) is detected, then a correction coefficient to uniformly correct illuminance in one scanning line is calculated, and laser A and B drive currents are supplied based on the correction coefficient. As can be seen from FIG. 18, the same correction coefficient is used for multiple light beams, so although the light amount distribution 14ai of the laser A can be corrected uniformly, the light amount distribution 14bi of the laser B (light emission portion 14b) has a gradient, which makes it impossible to suppress an illuminance difference between multiple light beams.

Unevenness in density of image due to such an inter-light-beams illuminance difference where there are differences in density between multiple dots adjacent to each other is more conspicuous than unevenness in density of image due to light amount decreasing where density continuously changes in one scanning line. Therefore, even if the light amount decreasing is completely eliminated, when the inter-light-beams illuminance difference remains, it is impossible to form a favorable image where no unevenness in density of image exists.

SUMMARY OF THE INVENTION

An object of the present invention is to provide a multi-beam optical scanning apparatus, which is capable of reducing an inter-light-beams illuminance difference at the same image height on a surface to be scanned and forming a high-definition and high-quality image where no unevenness in density of image exists, and an image forming apparatus using the multi-beam optical scanning apparatus.

According to a first aspect of the present invention, there is provided a multi-beam optical scanning apparatus including: light source means including a plurality of light emission portions; a light deflector including a deflecting surface; an incident optical system that brings a plurality of light beams emitted from the plurality of light emission portions into incident on the deflecting surface of the light deflector with a light beam wider than the deflecting surface in a main scanning direction; an imaging optical system for imaging the plurality of light beams reflected by the light deflector on a surface to be scanned; and control means for independently controlling emission light amount of each of the plurality of light emission portions, in which when controlling the emission light amount of each of the plurality of light emission portions so that illuminances of the plurality of light beams become same at every image height on the surface to be scanned, the control means changes emission light amounts of the plurality of light emission portions at a maximum scanning angle.

According to a second aspect of the present invention, there is provided a multi-beam optical scanning apparatus according to the first aspect, in which when controlling the emission light amount of each of the plurality of light emission portions so that illuminances of the plurality of light beams become same at every image height on the surface to be scanned, the control means changes emission light amounts of the plurality of light emission portions at a same scanning angle in a partial region of a whole scanning angle region.

According to the present invention, it becomes possible to achieve a multi-beam optical scanning apparatus, which is capable of reducing an inter-light-beams illuminance difference at the same image height on a surface to be scanned through electrical control of a laser output (emission light amount) in accordance with a scanning angle in a multi-beam optical scanning apparatus using an OFS and therefore is capable of obtaining a high-definition and high-quality image at high speed, and an image forming apparatus using the multi-beam optical scanning apparatus.

DESCRIPTION OF THE PREFERRED EMBODIMENTS

Hereinafter, embodiments of the present invention will be described with reference to the accompanying drawings.

First Embodiment

Figure 1:
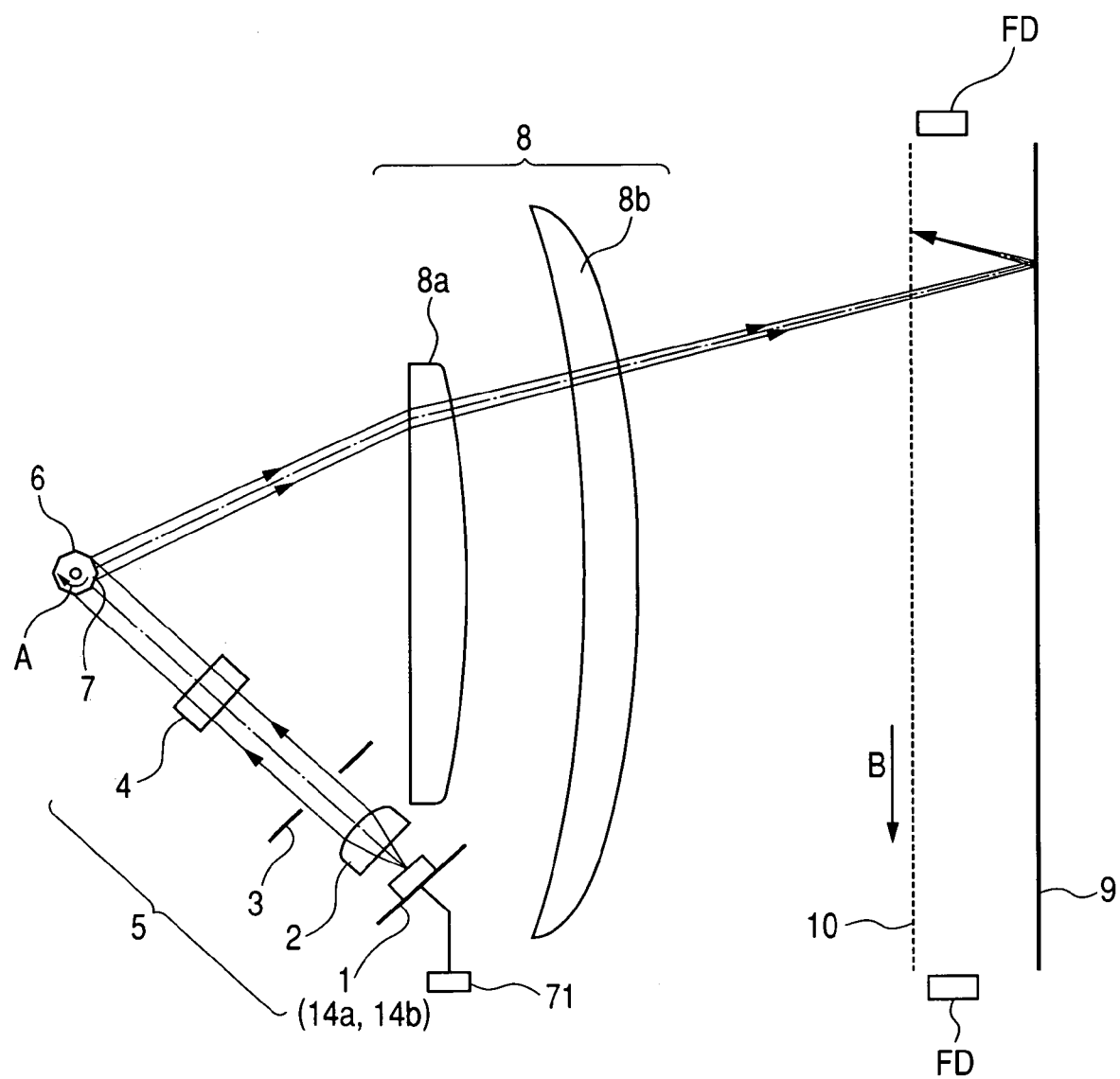
FIG. 1 is a main scanning sectional view of a first embodiment of the present invention.
Figure 2:
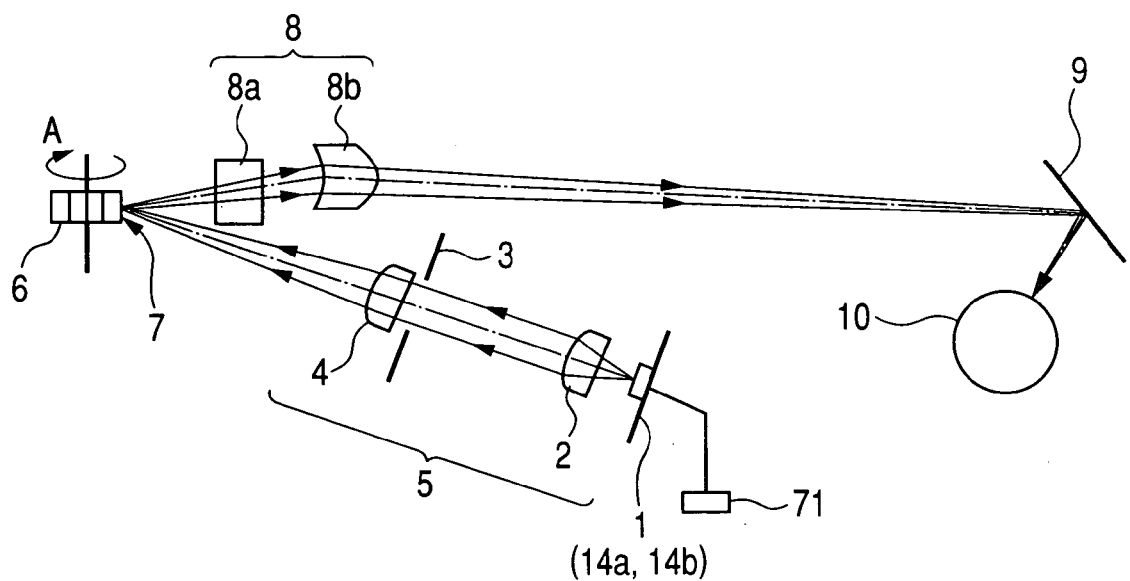
FIG. 2 is a sub-scanning sectional view of the first embodiment of the present invention.

FIG. 1 is a main portion sectional view (main scanning sectional view) taken in a main scanning direction of a multi-beam optical scanning apparatus using an OFS in a first embodiment of the present invention and FIG. 2 is a main portion sectional view (sub-scanning sectional view) taken in a sub-scanning direction of FIG. 1.

Here, a main scanning direction refers to a direction perpendicular to a rotation axis of a light deflector and an optical axis of a scanning optical element (direction in which a light beam is reflected and deflected (deflected and scanned) by the light deflector) and the sub-scanning direction refers to a direction parallel to the rotation axis of the light deflector. Also, a main scanning section refers to a plane parallel to the main scanning direction and containing the optical axis of the imaging optical system and a sub-scanning section refers to a section perpendicular to the main scanning section.

In the present invention, a scanning angle can be defined as an angle formed by the optical axis of the imaging optical system and a principal ray of a light beam reflected by a deflecting surface of a light deflector in the main scanning section.

Also, the maximum scanning angle can be defined as an angle formed by an optical axis of the imaging optical system and a principal ray of a light beam reaching the maximum image height (scanning end) of a surface to be scanned (photosensitive drum surface) in the main scanning section.

In FIG. 1, reference numeral 1 denotes light source means that is, for instance, composed of a monolithic multi-beam semiconductor laser including two light emission portions (lasers) 14a and 14b. Note that in the following description, the light emission portion 14a will also be referred to as the "laser A" (or the "light emission portion A") and the light emission portion 14b will also be referred to as the "laser B" (or the "light emission portion B").

In this first embodiment, the two light emission portions (lasers) 14a and 14b are spaced apart from each other in the main scanning direction.

When light emission portions are spaced apart from each other in the main scanning direction like in this embodiment, there occurs a problem in that an illuminance difference between two light beams, which doesn't cause a problem if the light emission potions are spaced apart from each other only in the sub-scanning direction, increases to a level at which the quality of a formed image is degraded.

A reason why this problem occurs will be described below.

When the two light emission portions (lasers) 14a and 14b are spaced apart from each other in the main scanning direction, a principal ray 14a of the laser A and a principal ray 14b of the laser B emitted from the two light emission portions (lasers) 14a and 14b are incident on a deflecting surface of a rotation polygon mirror 6 at mutually different angles in the main scanning section, so illuminance distributions 14a and 14b of the respective lasers A and B on the deflecting surface differ from each other, which become a factor of an illuminance difference between two light beams on a surface to be scanned.

Also, as a far field pattern narrows in the main scanning direction, the difference between the illuminance distributions 14a and 14b of the respective lasers A and B on the deflecting surface increases, and to increase the illuminance difference between the two beams on the surface to be scanned. In the case of a multi-beam semiconductor laser, a direction, in which light emission portions are arranged to be spaced apart from each other, is parallel to a direction of an active layer, so there is a tendency that a far field pattern in the direction, in which the light emission portions are spaced apart from each other, is narrower than a far field pattern in a direction perpendicular to the direction in which the light emission portions are spaced apart from each other.

That is, an illuminance difference between two light beams on a surface to be scanned in the case where two light emission portions (lasers) are spaced apart from each other in the main scanning direction becomes larger than that in the case where the light emission portions are spaced apart from each other in the sub-scanning direction.

As described above, when light emission portions are spaced apart from each other in the main scanning direction, it is required to willingly reduce the illuminance difference between the two light beams in order to obtain favorable image quality free from unevenness in density of image due to an illuminance difference between two light beams on a surface to be scanned.

Reference numeral 71 denotes control means (control system) for controlling emission light amount of at least one of the lasers A and B (14a and 14b) (for the laser B (14b) in this embodiment). In this embodiment, by controlling the emission light amount of the laser B (14b) in accordance with a scanning angle, an illuminance difference between two light beams (hereinafter also referred to as the "inter-two-light-beams illuminance difference") is reduced on a surface to be scanned.

Reference numeral 2 denotes a collimator lens serving as a light beam conversion element that converts two divergent light beams emitted from the light source means 1 into parallel light beams.

Reference numeral 3 indicates an aperture (aperture stop) that shapes the parallel light beams emitted from the collimator lens 2 into a desired and optimum beam shape.

Reference numeral 4 denotes an anamorphic lens (sub-scanning cylindrical lens) serving as an anamorphic optical element that mainly has predetermined optical power (reflective power) only in the sub-scanning direction and forms a line image elongated in the main scanning direction on a deflecting surface 7 of a light deflector 6 to be described later.

It should be noted here that each of the collimator lens 2, the aperture stop 3, and the sub-scanning cylindrical lens 4, and the like is one element of an incident optical system 5.

The light deflector 6 is, for instance, composed of a rotation polygon mirror (polygon mirror) and is rotated at a constant speed in a direction of arrow A in the drawing by drive means (not shown) such as a motor.

Reference numeral 8 denotes an imaging optical system that has fθ characteristics, includes an fθ lens 8a having positive optical power only in the main scanning direction and a long toric lens 8b having predetermined optical power only in the sub-scanning direction, and achieves an optical face tangle error correction function by imaging two light beams based on image information reflected and deflected by the light deflector 6 on a photosensitive drum surface 10 serving as a surface to be scanned in the main scanning section and setting an optically conjugate relation between the deflecting surface 7 of the light deflector 6 and the photosensitive drum surface 10 in the sub-scanning section.

Reference numeral 9 denotes a turn back mirror serving as a reflecting member. The photosensitive drum surface (recording medium surface) 10 serves as a surface-to be scanned.

In this embodiment, two divergent light beams optically modulated and emitted from the monolithic multi-beam semiconductor laser 1 in accordance with image information are converted into parallel light beams by the collimator lens 2. The two light beams emitted from the collimator lens 2 pass through the aperture stop 3 (partially shielded) and are incident on the sub-scanning cylindrical lens 4. The two light beams passed through the sub-scanning cylindrical lens 4 are incident on the deflecting surface 7 of the light deflector 6 with a beam width in the main scanning direction wider than the width of the deflecting surface 7 of the light deflector 6 (so-called overfilled optical system (OFS)) and form a line image elongated in the main scanning direction on the deflecting surface 7.

In addition, the two light beams emitted from the sub-scanning cylindrical lens 4 are incident on the deflecting surface 7 of the light deflector 6 at predetermined angles in the main scanning direction and with predetermined angles in the sub-scanning section.

It should be noted here that the incident optical system 5 in this embodiment is not limited to the construction shown in FIG. 1. For instance, the two light beams emitted from the sub-scanning cylindrical lens 4 may be brought into incident on the light deflector 6 with predetermined angles from the front in the main scanning direction of the light deflector 6 (the center of a scanning range along the front in the main scanning direction of the light deflector 6, that is, the-center of a scanning range along the main scanning direction).

Then, the light beams partially reflected and deflected by the deflecting surface 7 of the light deflector 6 are guided onto the photosensitive drum surface 10 by the imaging optical system 8, optically scans the photosensitive drum surface 10 in a direction of arrow B (main scanning direction) by the rotation of the light deflector 6 in the direction of arrow A, and performs image information recording.

Figure 14:
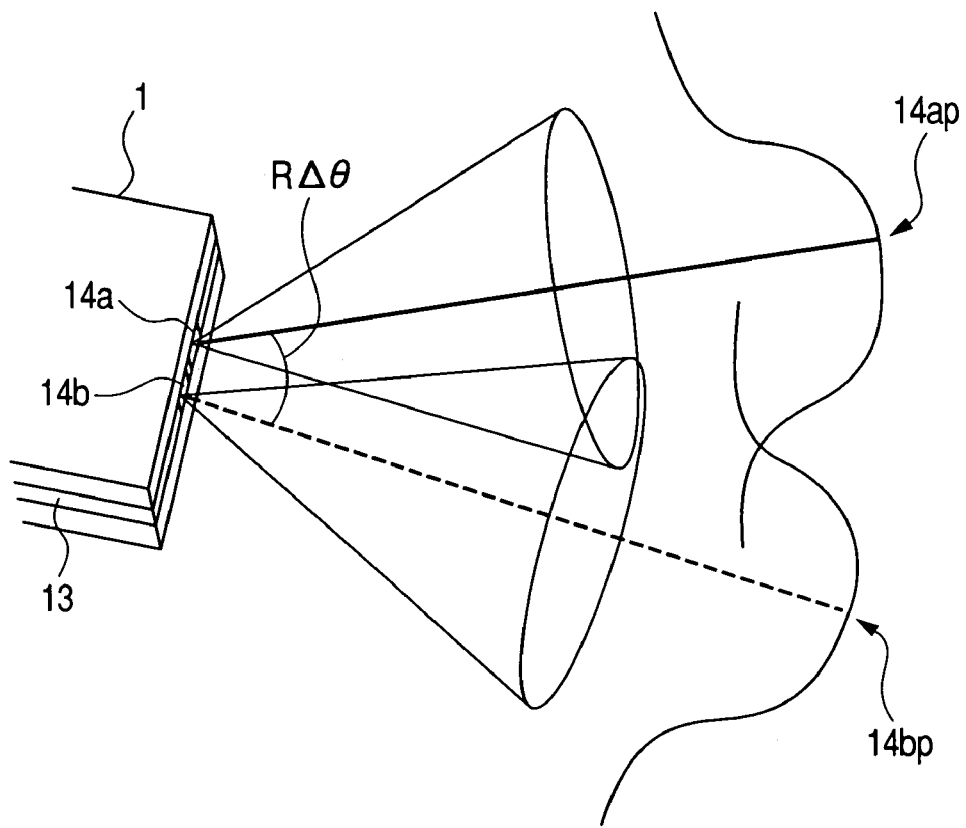
FIG. 14 is a main portion schematic diagram of a monolithic multi-beam laser.
Figure 15:
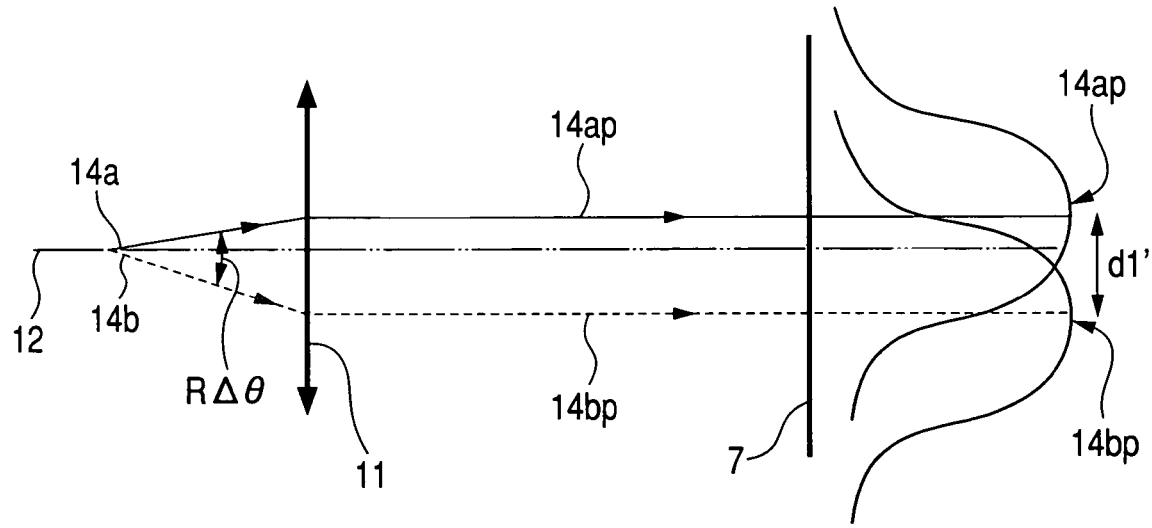
FIG. 15 is an explanatory diagram (main scanning sectional view) of a displacement between intensity center positions of two beams.
Figure 16:
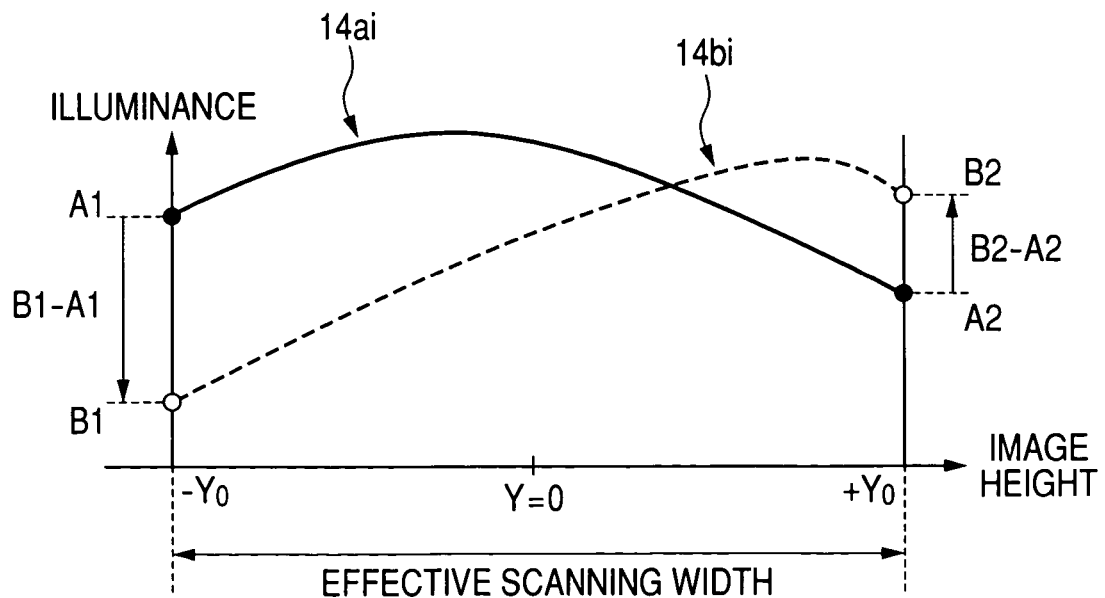
FIG. 16 shows a conventional illuminance distribution (where a laser emission light amount is constant)
Figure 17:
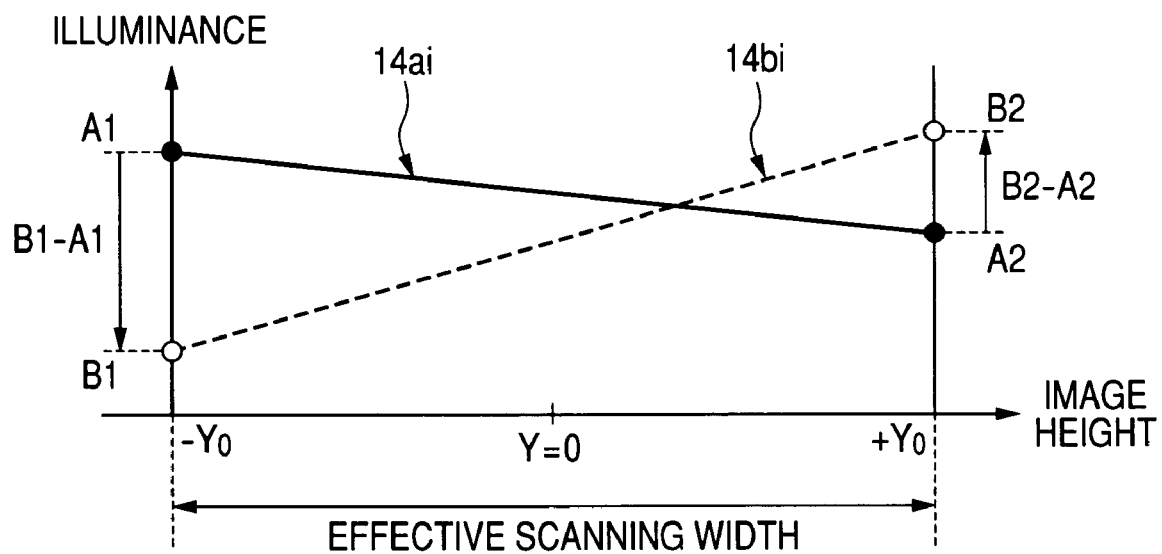
FIG. 17 shows a conventional illuminance distribution.
Figure 18:
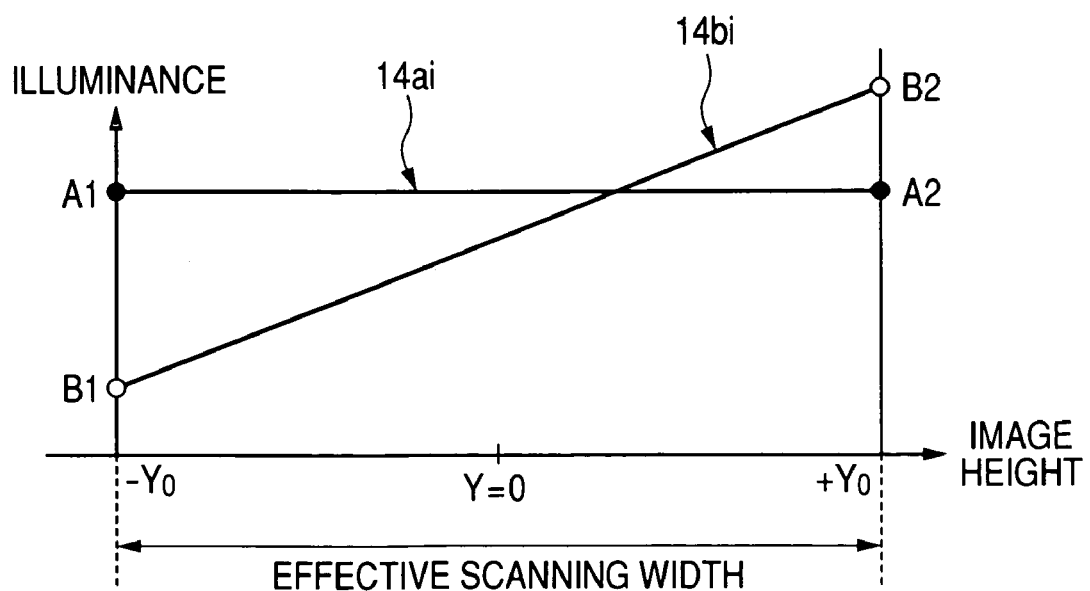
FIG. 18 shows a conventional illuminance distribution.

In this embodiment, like in the case shown in FIG. 14 described above, the light source means 1 is composed of a monolithic multi-beam semiconductor laser in which an angle difference $R\Delta\theta$ exists between intensity center lines 14ap and 14bp of the two light beams with respect to the main scanning direction.

Figure 3:
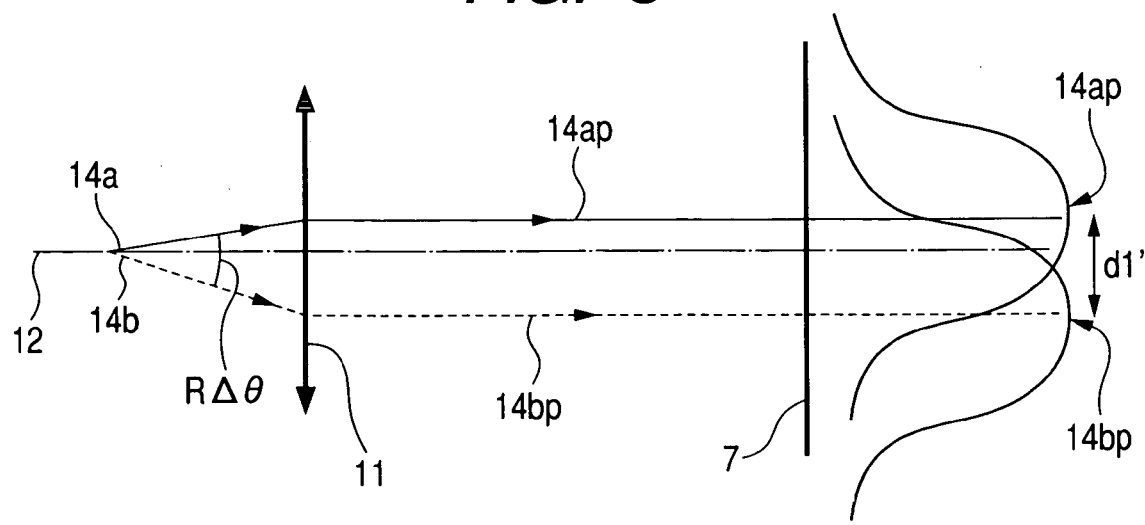
FIG. 3 is an explanatory diagram (main scanning sectional view) of a displacement between intensity center positions of two beams.

FIG. 3 is a main portion sectional view (main scanning sectional view) taken in the main scanning direction of the multi-OFS in this embodiment. In this drawing, each element that is the same as an element shown in FIG. 1 is given the same reference symbol.

In the drawing, the incident optical system is illustrated as one condensing optical system 11. The intensity center lines 14ap and 14bp of the two light beams emitted from the lasers A and B (light emission portions) 14a and 14b are inclined with variations with respect to an optical axis 12 of the condensing optical system 11.

Figure 4A:
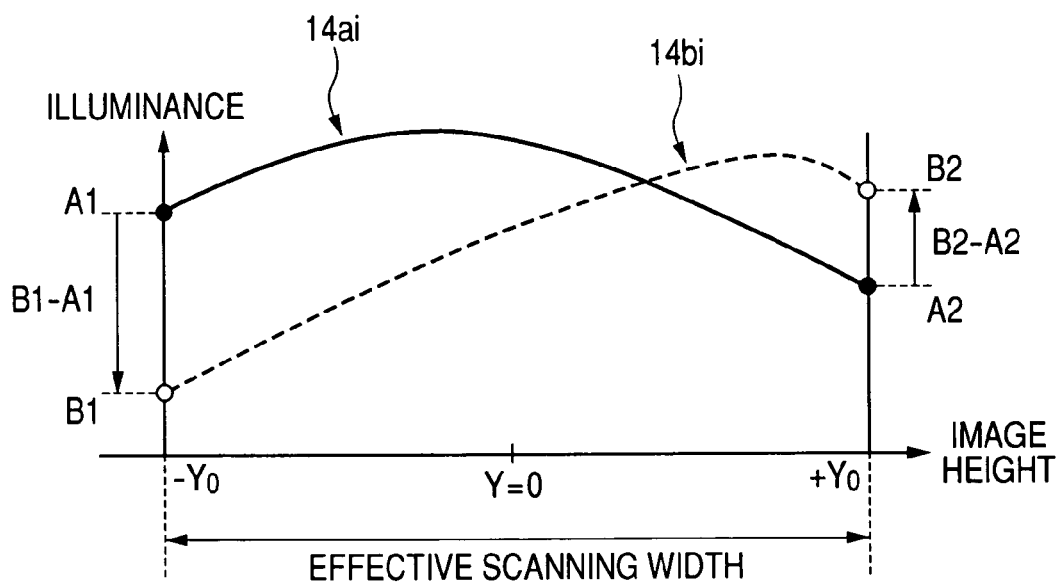
FIG. 4A shows an illuminance distribution (where a laser emission light amount is constant) in the first embodiment of the present invention.

FIG. 4A shows illuminance distributions 14ai and 14bi on the surface to be scanned of the two light beams 14a and 14b emitted from the lasers A and B in the case where a laser drive current amount in the multi-OFS shown in FIG. 3 is set at a constant value $I_0$ at every image height. As can be seen from FIG. 4A, in addition to a tendency that both of laser illuminances of the lasers A and B decrease as the image height Y changes from "0" to the maximum image heights "$\pm Y_0$", an illuminance difference occurs between the two light beams of the laser A and the laser B at the same image height.

Therefore, in this embodiment, in order to reduce the illuminance difference between the two light beams, a photodetector FD is arranged at the maximum image height position on the surface to be scanned as detection means for detecting the illuminances of the laser A and the laser B at the maximum image height and the emission light amount of the laser B is changed in accordance with the image height (scanning angle) by the control means 71 based on the illuminances A1, A2, B1, and B2 of the lasers A and B detected at the maximum image height.

In this embodiment, the control of the emission light amount of the laser B in accordance with each image height is performed by controlling a drive current amount of the laser B.

The control means 71 changes the emission light amounts of the two light emission portions 14a1 and 14bl at the same scanning angle in a partial region of a whole scanning angle region, thereby setting the illuminances 14ai and 14bi of the respective lasers A and B to the same illuminance at the same image height on the surface to be scanned.

Figure 5:
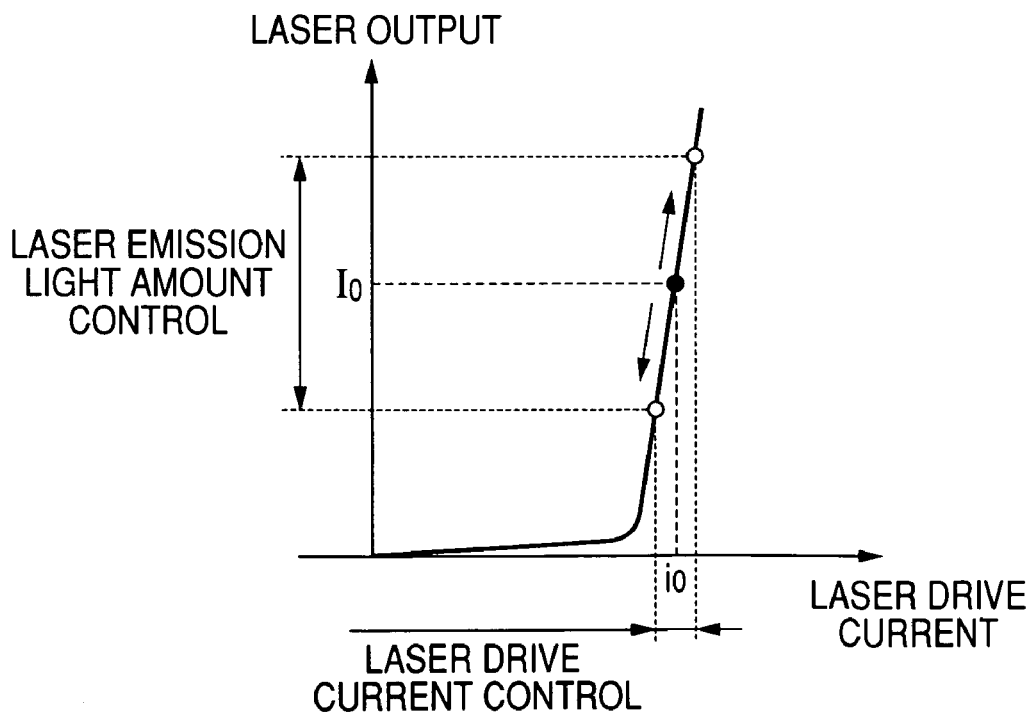
FIG. 5 shows a relation between a laser drive current amount and an emission light amount in the first to third embodiments of the present invention.

FIG. 5 is a graph showing a laser emission light amount with respect to a laser drive current amount in this embodiment. As can be seen from FIG. 5, the laser emission light amount increases as the drive current amount increases. As shown in FIG. 5, in order to reduce an illuminance difference between two light beams, at an arbitrary image height, it is possible to control the laser emission light amount so as to increase or decrease by increasing or decreasing the laser drive current from the drive current amount $i_0$ where the laser emission light amount becomes $I_0$.

Figure 4B:
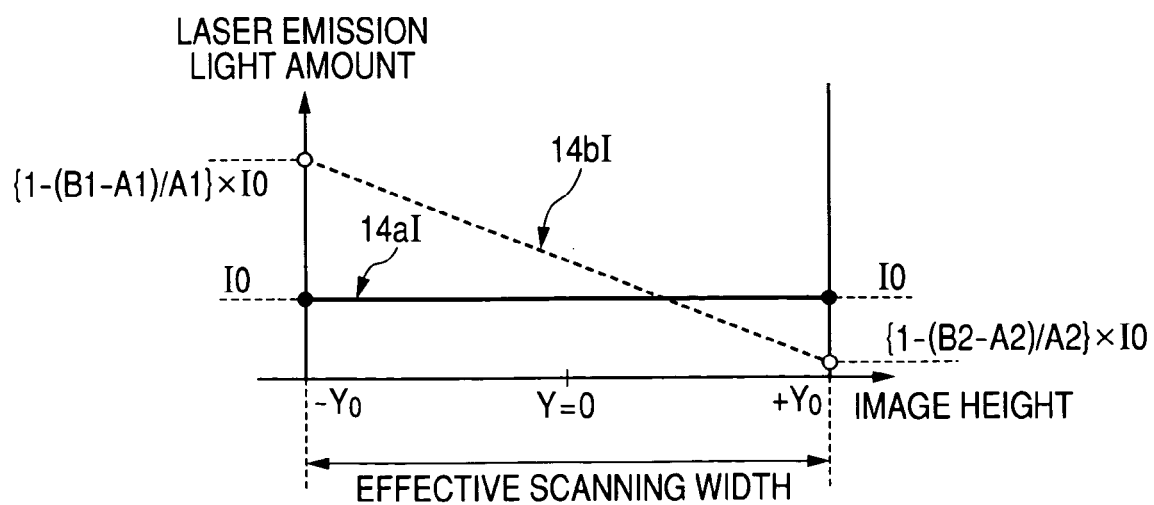
FIG. 4B shows a laser emission light amount in the first embodiment of the present invention.

FIG. 4B is a graph showing a laser emission light amount controlled by changing a drive current in accordance with an image height in order to reduce an illuminance difference between two light beams having illuminance distributions like the illuminance distributions shown in FIG. 4A.

As can be seen from FIG. 4B, the emission light amount 14aI of the laser A remains at the constant value $I_0$ at every image height and in order to reduce the illuminance difference between the laser A and the laser B at each image height, the drive current amount is controlled so that the emission light amount 14bI of the laser B monotonically decreases as the image height Y changes from $-Y_0$ to $+Y_0$.

For instance, the emission light amount IB of the laser B is linearly controlled so as to satisfy the equation (1):

$$IB = a \times Y + b \quad (1)$$

$$a = I0 \times \{(B1-A1)/A1 - (B2-A2)/A2\}/2Y0$$

$$b = I0 \times \{2 - (B1-A1)/A1 - (B2-A2)/A2\}/2$$

where Y is an arbitrary image height, IB is an emission light amount of the laser B at the arbitrary image height, A1 is an illuminance of the laser A at the image height $Y=-Y_0$ in the case where the emission light amount is at the constant value $I_0$, A2 is an illuminance of the laser A at the image height $Y=+Y_0$ in the case where the emission light amount is at the constant value $I_0$, B1 is an illuminance of the laser B at the image height $Y=-Y_0$ in the case where the emission light amount is at the constant value $I_0$, B2 is an illuminance of the laser B at the image height $Y=+Y_0$ in the case where the emission light amount is at the constant value $I_0$, I0 is an emission light amount of the laser A, and Y0 is the maximum image height.

It should be noted here that even when the laser emission light amount at the arbitrary image height Y does not satisfy the equation (1), so long as the illuminance at the maximum image height in the case where the emission light amount of the laser B is controlled satisfies the following conditional expression (1)', the effect of reducing an illuminance difference between two light beams is sufficiently provided:

$$0.9 \leq |B1'/A1'| \leq 1.1, \ 0.9 \leq |B2'/A2'| \leq 1.1 \quad (1)$$

where A1' is an illuminance of the laser A at the image height $Y=-Y_0$ in the case where the emission light amount control is performed, A2' is an illuminance of the laser A at the image height $Y=+Y_0$ in the case where the emission light amount control is performed, B1' is an illuminance of the laser B at the image height $Y=-Y0$ in the case where the emission light amount control is performed, and B2' is an illuminance of the laser B at the image height $Y=+Y0$ in the case where the emission light amount control is performed.

Figure 4C:
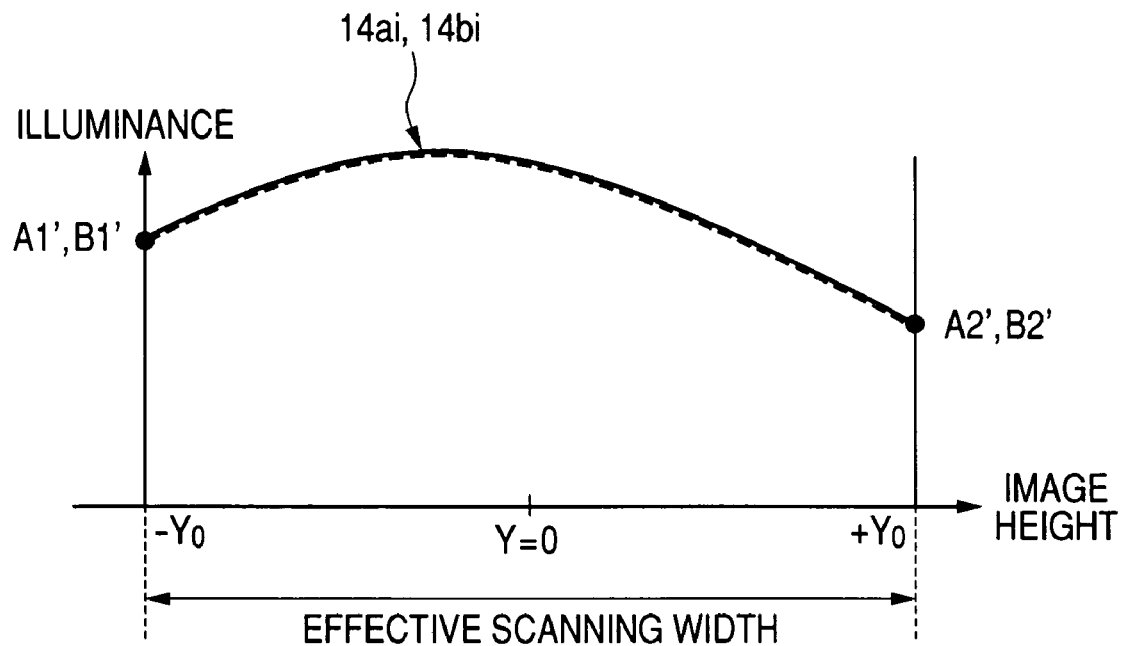
FIG. 4C shows an illuminance distribution (where laser emission light amount is controlled) in the first embodiment of the present invention.

FIG. 4C shows an illuminance distribution on the surface to be scanned 10 in the case where each laser emission light amount is controlled in the manner shown in FIG. 4B in this embodiment.

In FIG. 4C, the emission light amount IB of the laser B is controlled so that the illuminance on the surface to be scanned by the laser A (14a) and the illuminance on the surface to be scanned by the laser B (14b) agree with each other at each maximum image height ($Y=\pm Y_0$) on the surface to be scanned (A1'=B1', A2'=B2').

That is, the control means 71 changes the emission light amounts 14aI and 14bI of the two light emission portions at the maximum scanning angles.

In this embodiment, as shown in FIG. 4C, the illuminance distributions 14ai and 14bi of the respective lasers A and B are corrected to the same distribution at every image height. When the multi-OFS in this embodiment is applied to an image forming apparatus, for instance, it becomes possible to obtain a favorable image where unevenness in density of image due to an inter-light-beams illuminance difference is reduced.

However, it can be seen from FIG. 4C that the tendency that both of the illuminance distributions 14ai and 14bi by the lasers reduce as the image height increases and a gradient of the illuminances with respect to the image height remain. The unevenness in density of image due to the light amount decreasing and the illuminance gradient is also a factor of image degradation, however, both of them are continuous density changes and therefore are hard to recognize with unaided eyes. In contrast to this, the unevenness in density of image due to the inter-light-beams illuminance difference is easy to be recognized because significant density differences between adjacent dots exist. Therefore, it is expected that an effect of reducing image degradation can be obtained merely by reducing the unevenness in density of image due to the inter-light-beams illuminance difference.

In the present invention, when the emission light amount is controlled for each of the two light emission portions (lasers) 14a and 14b so that the illuminances of the two light beams become the same at every image height on the surface to be scanned (control method in FIG. 4B, for instance), it is preferable that the inter-two-light-beams illuminance difference on the surface to be scanned be 10% or less at every image height.

A situation where the inter-two-light-beams illuminance difference is 10% or less refers that the maximum value of the illuminance difference between the two light beams 14a and 14b at the same image height on the surface to be scanned at every image height is 10% or less.

When the inter-two-light-beams illuminance difference is 10% or less, the unevenness in density of image is suppressed to a level at which it is hard to recognize with unaided eyes.

In addition, as a result of recent increase in image definition, the unevenness in density of image becomes easier to be recognized. Consequently, it is more preferable that the inter-two-light-beams illuminance difference on the surface to be scanned be 1% or less at every image height.

That is, according to this embodiment, it becomes possible to suppress the unevenness in density of image and to obtain a favorable image merely by controlling the laser emission light amount for a conventional multi-OFS.

It should be noted here that in this embodiment, the emission light amount of the laser B is controlled by the control means, however, the present invention is not limited to this and the emission light amount of the laser A or the emission light amounts of the lasers A and B may be controlled.

Second Embodiment

Figure 6:
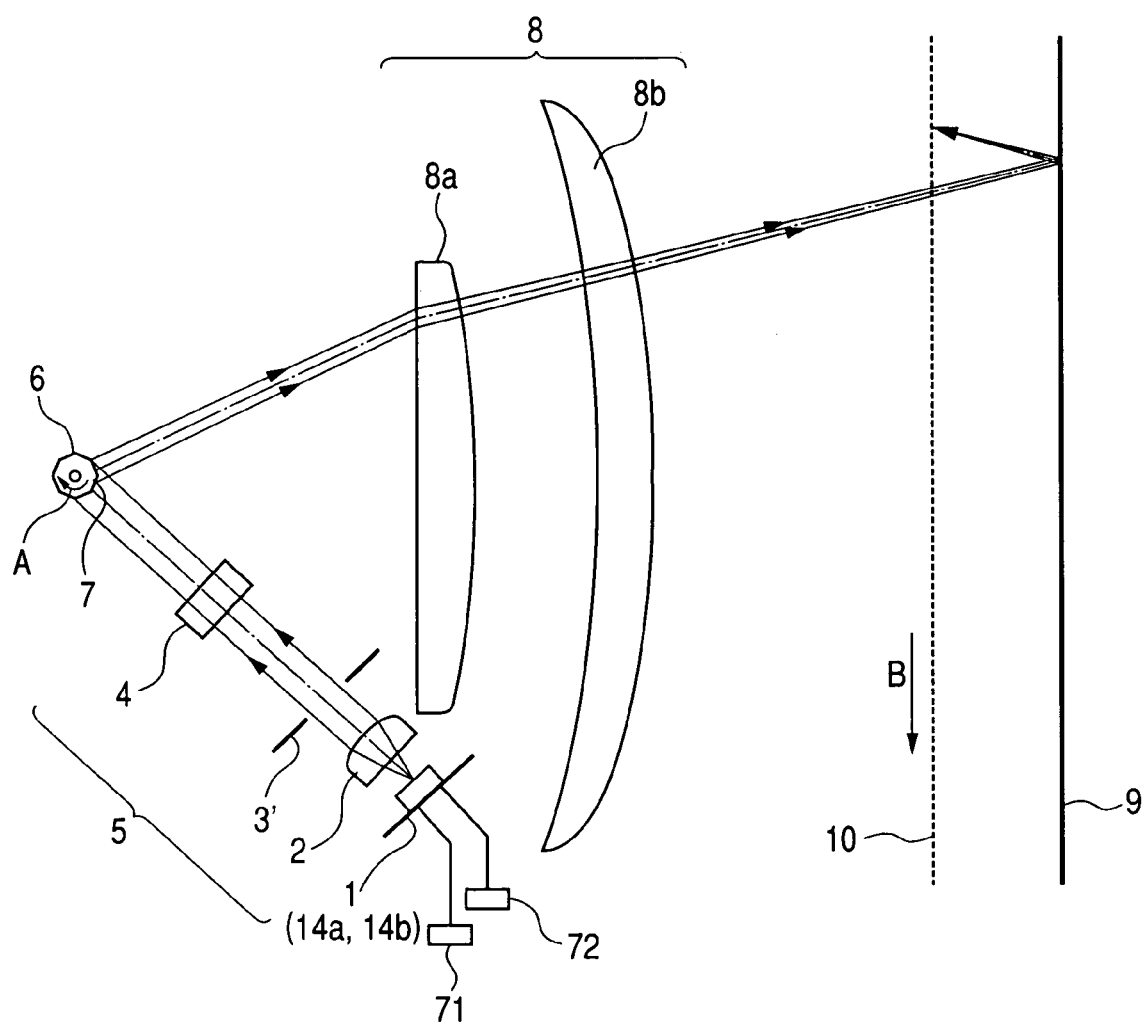
FIG. 6 is a main scanning sectional view of the second embodiment of the present invention.
Figure 7:
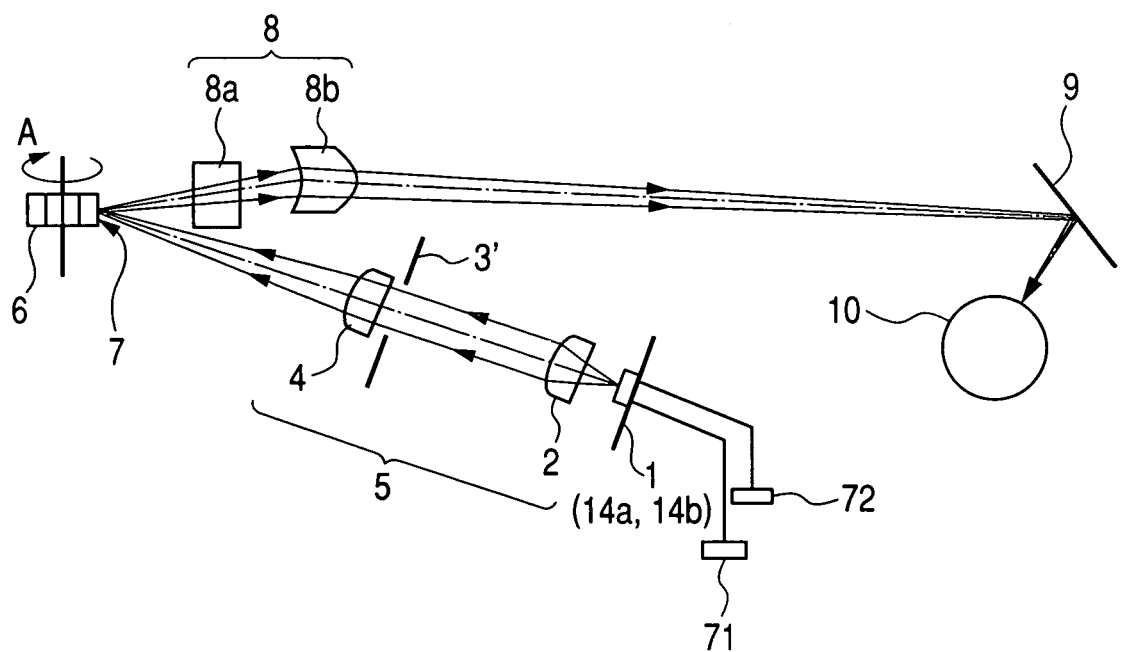
FIG. 7 is a sub-scanning sectional view of the second embodiment of the present invention.
Figure 8:
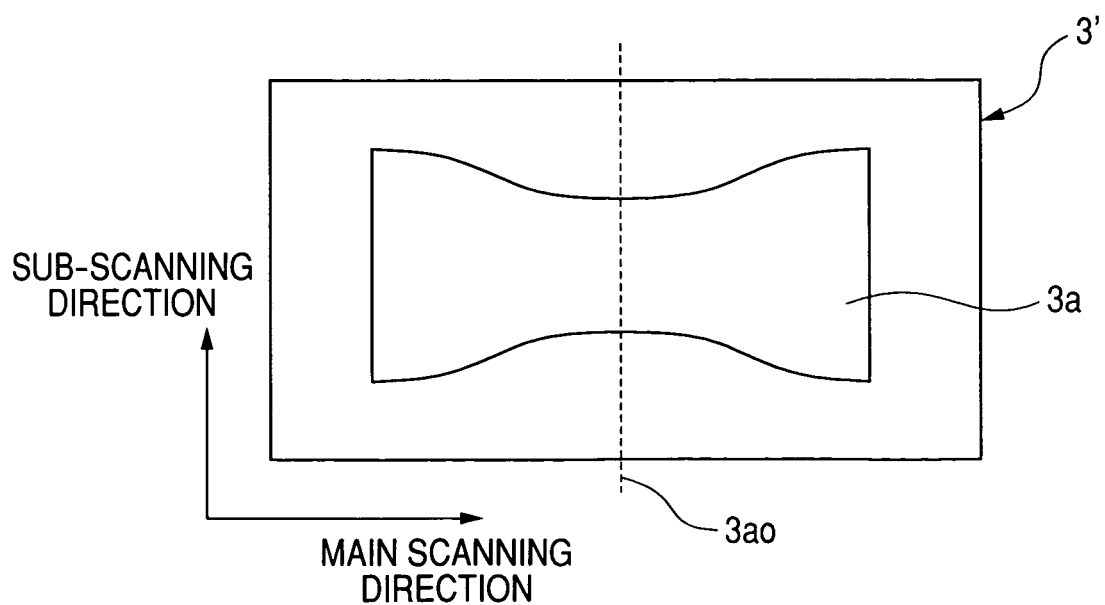
FIG. 8 shows light amount correcting means.

FIG. 6 is a main portion sectional view (main scanning sectional view) taken in the main scanning direction of a multi-beam optical scanning apparatus using an OFS in a second embodiment of the present invention. FIG. 7 is a main portion sectional view (sub-scanning sectional view) taken in the sub-scanning direction of FIG. 6. FIG. 8 is a main portion sectional view taken in an optical axis direction of an aperture 3' serving as light amount correcting means. In FIGS. 6, 7, and 8, each element that is the same as an element shown in FIGS. 1 and 2 is given the same reference symbol.

This embodiment differs from the first embodiment described above in the following points.

(1) An aperture (aperture stop) 3' is used as an illuminance distribution compensating optical element (light amount decrease compensating means) that compensates for light amount decrease in one scanning line on a surface to be scanned.

(2) Adjusting means is provided in order to adjust an interval between a position, at which the light intensity of the light beam emitted from the laser A (light emission portion) 14a is the maximum on the deflecting surface, and the center position of the effective scanning range on the surface to be scanned, and an interval between a position, at which the light intensity of the light beam emitted from the laser B (light emission portion) 14b is the maximum on the deflecting surface, and the center position of the effective scanning range on the surface to be scanned become equal to each other.

(3) The laser emission light amounts of the lasers A and B are independently controlled by the control means in accordance with the image height (scanning angle).

Other constructions and optical action are the same as those in the first embodiment, thereby providing the same effects.

In this second embodiment, the two light emission portions (lasers) 14a and 14b are spaced apart from each other in the main scanning direction and the sub-scanning direction.

In the drawing, the aperture (aperture stop) 3' serves as the illuminance distribution compensating optical element. With a form shown in FIG. 8 where the width in the sub-scanning direction of an opening shape 3a of an opening plate of the aperture 3' increases with respect to the main scanning direction in a direction from a center portion $3a_0$ to end portions in the main scanning direction, an illuminance on a scanning line on the surface to be scanned 10 increases in a direction from the center portion $3a_0$ to the end portions along the scanning direction. With this construction, in this embodiment, the light amount decrease in one scanning line on the surface to be scanned 10 is reduced.

Reference numeral 72 denotes adjusting means (adjusting mechanism) that rotates the multi-beam semiconductor laser 1 with respect to the main scanning direction. In this embodiment, with the adjusting means, emission directions of the light beams are adjusted so that an angle formed by the intensity center lines of the two light beams emitted from the multi-beam semiconductor laser 1 with respect to the main scanning direction is evenly distributed to right and left sides about the optical axis of the incident optical system.

Figure 9:
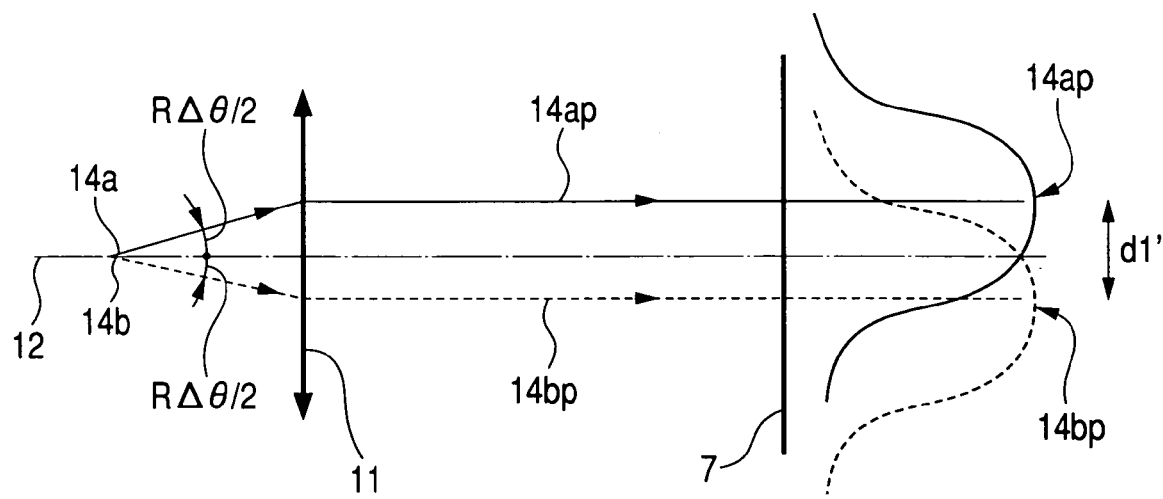
FIG. 9 is a main scanning sectional view of the second embodiment of the present invention.

FIG. 9 is a main portion sectional view (main scanning sectional view) taken in the main scanning direction of the multi-OFS in this embodiment. In the drawing, each element that is the same as an element shown in FIG. 6 is given the same reference symbol.

In the drawing, the incident optical system is illustrated as one condensing optical system 11. The intensity center lines 14ap and 14bp of the two light beams emitted from the lasers A and B (light emission portions) 14a and 14b are each inclined at the same angle RΔθ/2 with respect to the optical axis 12 of the condensing optical system 11. In the drawing, when the two light fluxes pass through the condensing optical system 11, the intensity center lines 14ap and 14bp of the two light beams that each have the angle RΔθ/2 with respect to the optical axis 12 pass bilaterally symmetric positions with respect to the optical axis 12 of the condensing optical system 11. Therefore, the two light beams incident on the deflecting surface 7 have intensity distributions that are bilaterally symmetric about a center position of an effective light beam width with respect to the main scanning direction. In this case, a total sum of the light amounts of the two light beams incident on one deflecting surface becomes the maximum. That is, the usage efficiencies of the emitted light beams become the highest. As a result, the drive current is minimized and power consumption of the present apparatus is reduced.

Figure 10A:
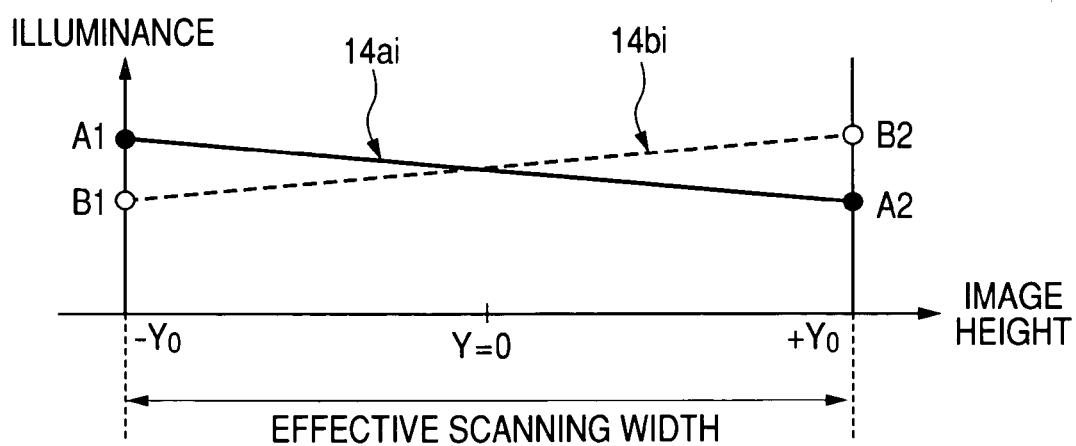
FIG. 10A shows an illuminance distribution (where a laser emission light amount is constant) in the second embodiment of the present invention.

FIG. 10A shows illuminance distributions 14ai and 14bi on the surface to be scanned of the two light beams in the case where the laser emission light amount in the multi-OFS shown in FIG. 9 is set constant at every image height. As can be seen from FIG. 10A, the light amount decrease of the two light beams is corrected with the shape where the width in the sub-scanning direction of the opening shape of the opening plate of the aperture (aperture stop) 3' increases in the direction from the center portion to the end portions in the main, scanning direction.

Also, it can be seen that as a result of the equal distribution by the adjusting means of the angle difference $R\Delta\theta$ formed by the intensity center lines 14ap and 14bp of the two light beams with respect to the main scanning direction to the right and left sides about the optical axis of the incident optical system, the illuminance distributions of the two light beams become symmetric about the image height $Y=0$, However, there occurs an illuminance difference between the two light beams of the lasers A and B at the same image height.

In this embodiment, as-shown in FIG. 10A, in order to reduce the inter-two-light-beams illuminance difference on the surface to be scanned, the laser emission light amounts of the two lasers A and B are independently controlled by the control means in accordance with the image height (scanning angle).

Figure 10B:
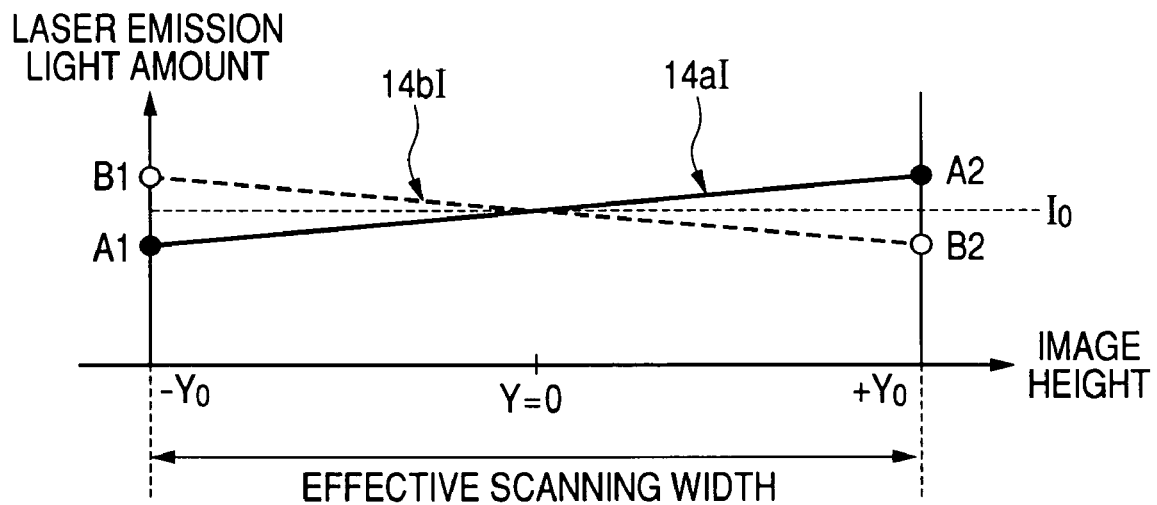
FIG. 10B shows a laser emission light amount in the second embodiment of the present invention.

FIG. 10B is a graph showing the emission light amounts of the two controlled lasers A and B with respect to each image height.

As described above, the control means in this embodiment is different from that in the first embodiment and reduces the inter-two-light-beams illuminance difference on the surface to be scanned by independently controlling the laser emission light amounts of the lasers A and B in accordance with the image height.

That is, the control means 71 and the adjusting means 72 change the emission light amounts 14aI and 14bI of the two light emission portions at the maximum scanning angles.

As can be seen from FIG. 10B, in order to reduce the illuminance difference between the lasers A and B at each image height, each laser drive current amount is changed so that the emission light amount 14aI of the laser A monotonically increases as the image height Y changes from $-Y_0$ to $+Y_0$ and the emission light amount 14bI of the laser B monotonically decreases as the image height Y changes from $-Y_0$ to $+Y_0$. Straight lines expressing the emission light amounts of the lasers A and B in this case become bilaterally symmetric about the image height $Y=0$.

For instance, it is sufficient that the emission light amounts IA and IB of the lasers A and B are linearly independently controlled so as to satisfy the following equations (2):

$$IA=I0\{(A1-B1)/2/B1/Y0\cdot Y\}$$

$$IB=I0\{(A2-B2)/2/A2/Y0\cdot Y\} \quad (2)$$

where Y is an arbitrary image height, IA is an emission light amount of the laser A at the arbitrary image height, IB is an emission light amount of the laser B at the arbitrary image height, A1 is an illuminance of the laser A at the image height $Y=-Y_0$ in the case where the emission light amount is at a constant value $I_0$, A2 is an illuminance of the laser A at the image height $Y=+Y_0$ in the case where the emission light amount is at the constant value $I_0$, B1 is an illuminance of the laser B at the image height $Y=-Y_0$ in the case where the emission light amount is at the constant value $I_0$, B2 is an illuminance of the laser B at the image height $Y=+Y_0$ in the case where the emission light amount is at the constant value $I_0$, I0 is an emission light amount at the constant value, and Y0 is the maximum image height.

However, even when the emission light amounts do not satisfy the equation (2), so long as the illuminance at the maximum image height at the time when the emission light amount of the laser B is controlled satisfies the following equation (2)', the effect of reducing the inter-two-light-beams illuminance difference on the surface to be scanned is sufficiently provided:

$$0.9 \leq |B1'/A1'| \leq 1.1, \ 0.9 \leq |B2'/A2'| \leq 1.1 \quad (2)'$$

where A1' is an illuminance of the laser A at the image height $Y=-Y_0$ in the case where the emission light amount control is performed, A2' is an illuminance of the laser A at the image height $Y=+Y_0$ in the case where the emission light amount control is performed, B1' is an illuminance of the laser B at the image height $Y=-Y_0$ in the case where the emission light amount control is performed, and B2' is an illuminance of the laser B at the image height $Y=+Y_0$ in the case where the emission light amount control is performed.

A relation "A1=B1, A2=B2" is obtained between the illuminances of the respective lasers at each maximum image height ($\pm Y_0$) by satisfying the equation (2)' given above and the illuminance distributions 14ai and 14bi of the lasers A and B become bilaterally symmetric at all times as a result of the equal distribution of $R\Delta\theta$ with respect to the optical axis of the incident optical system, so a relation "A1=B2, A2=B1" is obtained at all times, as a result of which the illuminance distributions 14ai and 14bi of the lasers A and B become uniform at every image height and it becomes possible to eliminate the inter-two-light-beams illuminance difference.

The control means 71 and the adjusting means 72 change the emission light amounts of the two light emission portions 14al and 14bl at the same scanning angle in a partial region of a whole scanning angle region and set the illuminances 14ai and 14bi of the respective lasers A and B at the same image height on the surface to be scanned to the same illuminance.

Figure 10C:
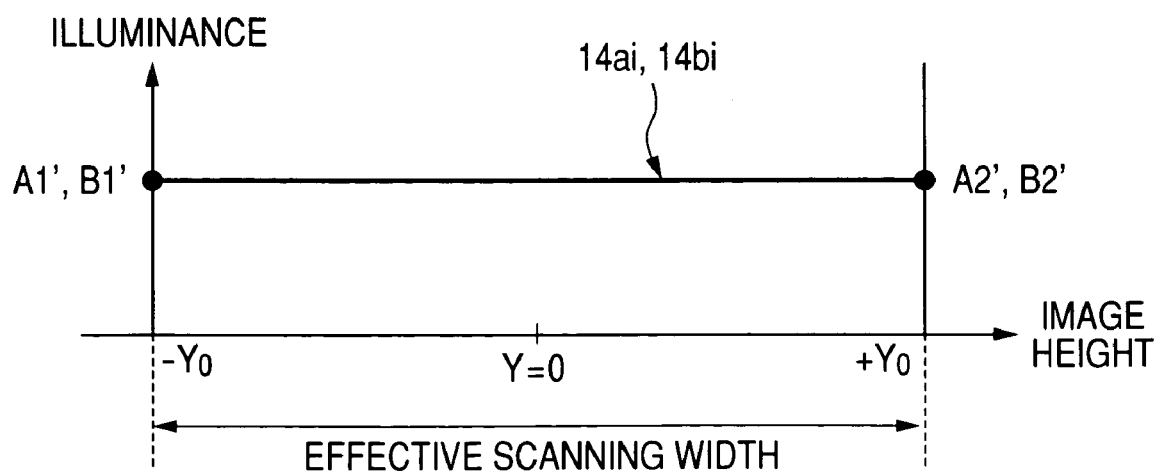
FIG. 10C shows an illuminance distribution (where laser emission light amount is controlled) in the second and third embodiments of the present invention.

FIG. 10C shows the illuminance distributions 14ai and 14bi on the surface to be scanned in the case where the laser emission light amounts IA and IB are each controlled in the manner shown in FIG. 10B. It can be seen from FIG. 10C that the illuminance distributions 14ai and 14bi of the lasers A and B each remain constant at every image height and are corrected to the same distribution. A relation "A1'=A2', B1'=B2'" is obtained between the respective laser illuminances of the lasers A and B.

That is, according to this embodiment, by applying the illuminance distribution compensating optical element and the control means for independently controlling the emission light amount of the two lasers A and B to a conventional multi-OFS, it becomes possible to simultaneously reduce the illuminance distribution gradient due to the inter-two-light-beams illuminance difference and the illuminance distribution gradient due to the light amount decreasing. As a result, in this embodiment, compensation to a uniform illuminance distribution becomes possible, which makes it possible to suppress the unevenness in density of image and obtain a favorable image.

Third Embodiment

Next, a third embodiment of the present invention will be described. Note that the main scanning sectional view and the sub-scanning sectional view in this embodiment are the same as FIGS. 1 and 2 relating to the first embodiment described above.

This embodiment differs from the first embodiment described above in the following points.

(1) An adjusting means is provided for adjusting so that a position, at which the light intensity of the light beam emitted from the laser A among the lasers A and B (light emission portions) in the main scanning section becomes the maximum, and the center position of the effective scanning range on the surface to be scanned in the main scanning section approximately coincide with each other on the deflecting surface.

(2) Both of the laser emission light amounts of the lasers A and B are non-linearly independently controlled by a control means in accordance with the image height (scanning angle).

Other constructions and optical action are the same as those in the first embodiment, thereby providing the same effects.

In this third embodiment, the two light emission portions (lasers) 14a and 14b are spaced apart from each other in the main scanning direction and the sub-scanning direction.

That is, in this embodiment, by the adjusting mechanism (not shown), the light beam intensity center line 14ap among the intensity center lines 14ap and 14bp of the two light beams emitted from the lasers A and B with respect to the main scanning direction is brought into coincident with the optical axis 12 of the incident optical system.

Figure 11A:
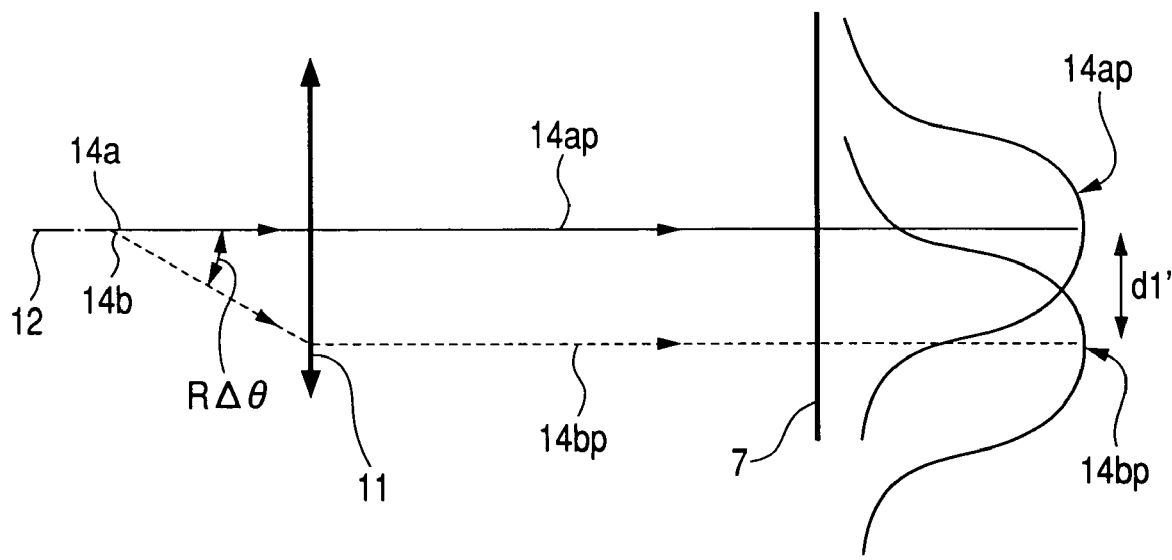
FIG. 11A is a main scanning sectional view of the third embodiment of the present invention.

FIG. 11A is a main portion sectional view (main scanning sectional view) taken in the main scanning direction of the multi-OFS in this embodiment.

In the drawing, the incident optical system is illustrated as one condensing optical system 11. The intensity center line 14ap of the light beam emitted from the laser A (light emission portion) 14a is adjusted by the adjusting means so as to coincide with the optical axis 12 of the condensing optical system 11 and the intensity center line 14bp of the light beam emitted from the laser B (light emission portion) 14b is inclined at the angle $R\Delta\theta$ with respect to the optical axis 12 of the condensing optical system 11.

As can be seen from FIG. 11A, since the light flux intensity center line 14ap is incident on the deflecting surface 7 at the center position of the effective light beam width with respect to the main scanning direction, bilaterally symmetric intensity distribution is obtained.

Figure 11B:
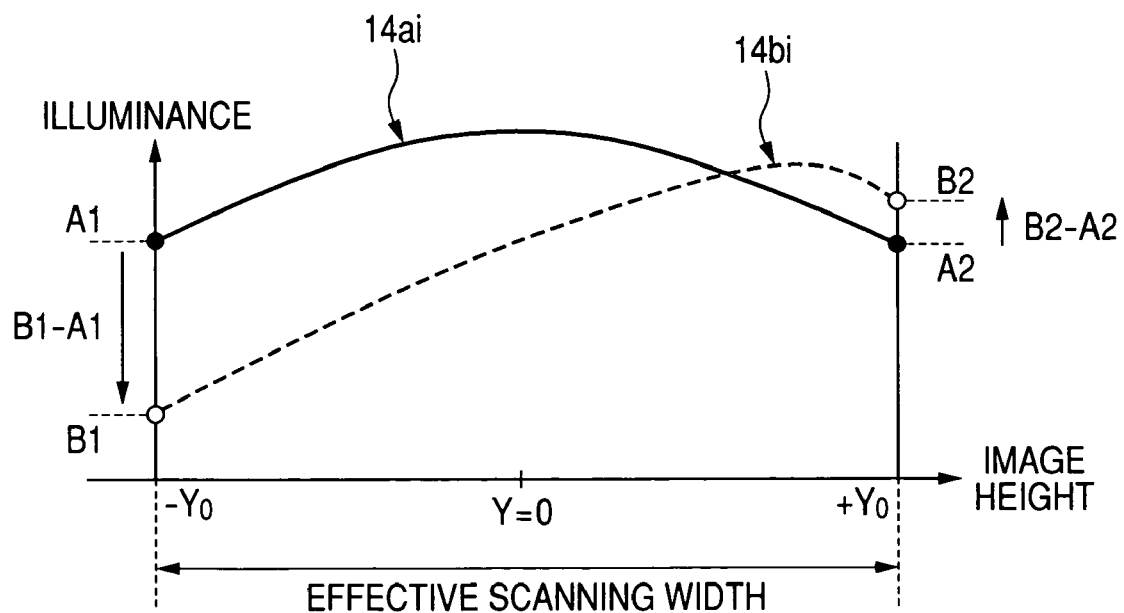
FIG. 11B shows an illuminance distribution (where a laser emission light amount is constant) in the third embodiment of the present invention.

FIG. 11B shows illuminance distributions of the two light beams on the surface to be scanned in the case where the laser emission light amount is set at the constant value $I_0$ at every image height in the multi-OFS shown in FIG. 11A. It can be seen from FIG. 11B that the intensity center line 14ap of the light beam 14a emitted from the laser A is adjusted using the adjusting means so as to coincide with the optical axis 12 of the condensing optical system 11, so the illuminance distribution 14ai of the laser A becomes symmetric about the image height Y=0. It also can be seen that the illuminance distribution 14bi of the laser B has a gradient, so an illuminance difference occurs between the two light beams of the lasers A and B at the same image height. It further can be seen that light amount decrease occurs to both of the illuminance distributions 14ai and 14bi of the lasers A and B.

Figure 11C:
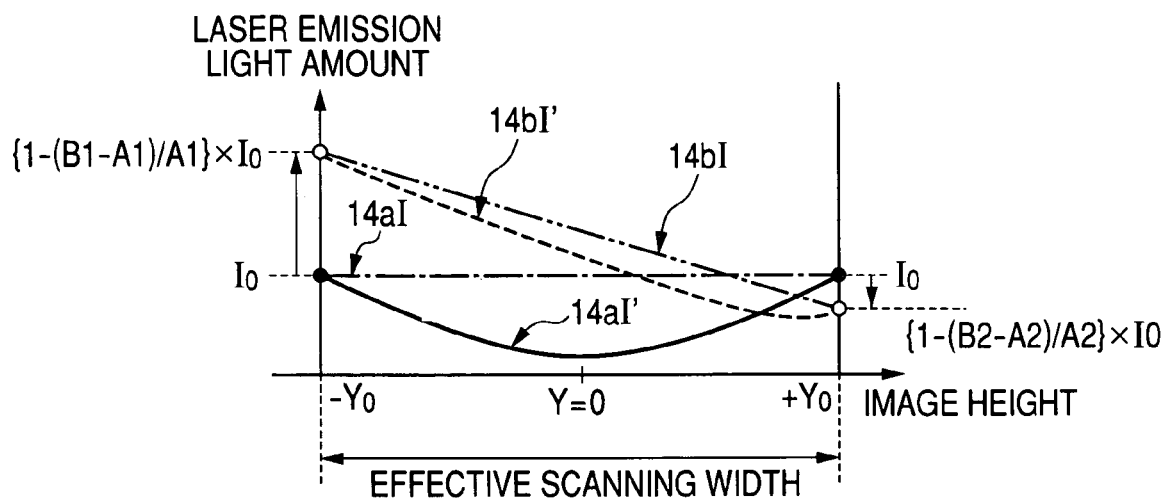
FIG. 11C shows a laser emission light amount in the third embodiment of the present invention.

FIG. 11C shows each laser emission light amounts in the case where the emission light amounts of the laser A and B are controlled independently of each other in accordance with the image height in the multi-OFS having the illuminance distributions 14ai and 14bi shown in FIG. 11B.

A one-dot chain line 14aI and a two-dot chain line 14bI in FIG. 11C indicate emission light amounts with respect to the image height in the case where each laser emission light amount is linearly changed in accordance with the image height in order to reduce the inter-two-light-beams illuminance difference.

As can be seen from the one-dot chain line 14aI and the two-dot chain line 14bI in FIG. 1C, each laser emission light amount is controlled so that the emission light amount 14aI of the laser A remains at the constant value $I_0$ at every image height and the emission light amount 14bI of the laser B monotonically decreases as the image height Y changes from $-Y_0$ to $+Y_0$, thereby reducing the illuminance difference between the lasers A and B at each image height.

For instance, the emission light amounts IA and IB of the lasers A and B are linearly controlled in accordance with the image height so as to satisfy the following equations (3):

$$IA=I0$$

$$IB=a*Y+b$$

$$a=I0*\{(B1-A1)/A1-(B2-A2)/A2\}/2Y0$$

$$b=I0*\{2-(B1-A1)/A1-(B2-A2)/A2\}/2 \quad (3)$$

where Y is an arbitrary image height, IA is an emission light amount of the laser A at the arbitrary image height, IB is an emission light amount of the laser B at the arbitrary image height, A1 is an illuminance of the laser A at the image height $Y=-Y_0$ in the case where the emission light amount is at the constant value $I_0$, A2 is an illuminance of the laser B at the image height $Y=+Y_0$ in the case where the emission light amount is at the constant value $I_0$, B1 is an illuminance of the laser B at the image height $Y=-Y_0$ in the case where the emission light amount is at the constant value $I_0$, B2 is an illuminance of the laser B at the image height $Y=+Y_0$ in the case where the emission light amount is at the constant value $I_0$, I0 is the emission light amount constant value, and Y0 is the maximum image height.

Figure 11D:
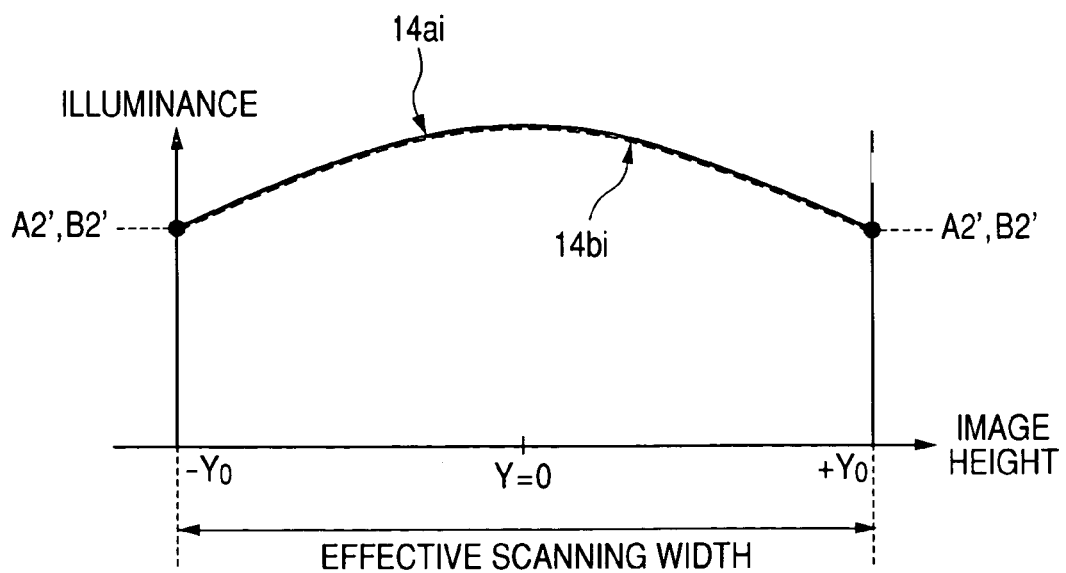
FIG. 11D shows an illuminance distribution (where the laser emission light amount is linearly controlled) in the third embodiment of the present invention.

FIG. 11D shows the illuminance distributions 14ai and 14bi on the surface to be scanned of the lasers A and B in the case where the emission light amounts of the lasers A and B at the arbitrary image height are controlled so as to become as indicated by the one-dot chain line 14aI and the two-dot chain line 14bI in FIG. 11C in the multi-OFS having the illuminance distributions 14ai and 14bi shown in FIG. 11B under a state where the emission light amounts are set at the constant value $I_0$ at every image height.

It can be seen from FIG. 11D that the illuminance difference between the two light beams of the lasers A and B is reduced, but light amount decrease occurs to both of the illuminance distributions 14ai and 14bi of the lasers A and B.

Therefore, in this embodiment, in order to simultaneously reduce the inter-two-light-beams illuminance difference and the light amount decrease, the emission light amounts of the lasers A and B at the arbitrary image height are controlled so as to become as indicated by a solid line 14aI' and a dotted line 14bI' in FIG. 11C. The solid line 14aI' and the dotted line 14bI' in FIG. 11C are obtained by adding a tendency for elimination of each light amount decrease, in which the emission light amount is small at the image height Y=0 and increases as the image height increases, to an emission-light-amount changing amount for reduction of the inter-two-light-beams illuminance difference that is linear with respect to the image height.

For instance, the emission-light-amount changing amount with respect to the image height for the elimination of the light amount decrease can be approximated by a product of a ratio of decrease in facet width along with a change in image height Y from "0" to the maximum image height and a ratio of decrease in Gaussian-distributed light intensity on the deflecting surface along with the change in image height Y from "0" to the maximum image height. Therefore, the solid line 14*a*I' and the dotted line 14*b*I' in FIG. 11C can be obtained by multiplying each of expressions expressing the one-dot chain line 14*a*I and the two-dot chain line 14*b*I meaning the emission-light-amount change amount that is linear with respect to the image height for the reduction of the inter-two-light-beams illuminance difference by an inverse number of [{(facet width at the arbitrary image height)/(facet width at the image height Y=0)}*{(light intensity at end portion of an effective light beam width)/(light intensity at the center portion of an effective light beam width)}].

In the first and second embodiments described above, the emission light amounts are controlled so as to be changed linearly in accordance with the image height. In contrast to this, in this embodiment, the emission light amounts of the lasers A and B are non-linearly and independently controlled. As a result, it becomes possible to-simultaneously reduce the inter-two-light-beams illuminance difference and the light amount decrease without using an optical element such as light amount correcting means (aperture 3').

Figure 11E:
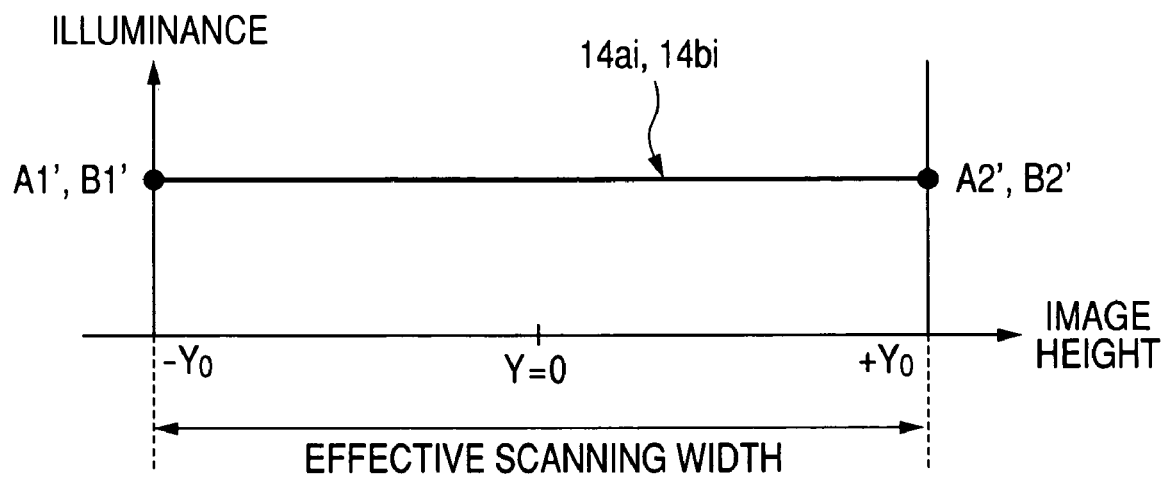
FIG. 11E shows an illuminance distribution (where the laser emission light-amount is non-linearly controlled) in the third embodiment of the present invention.
Figure 12:
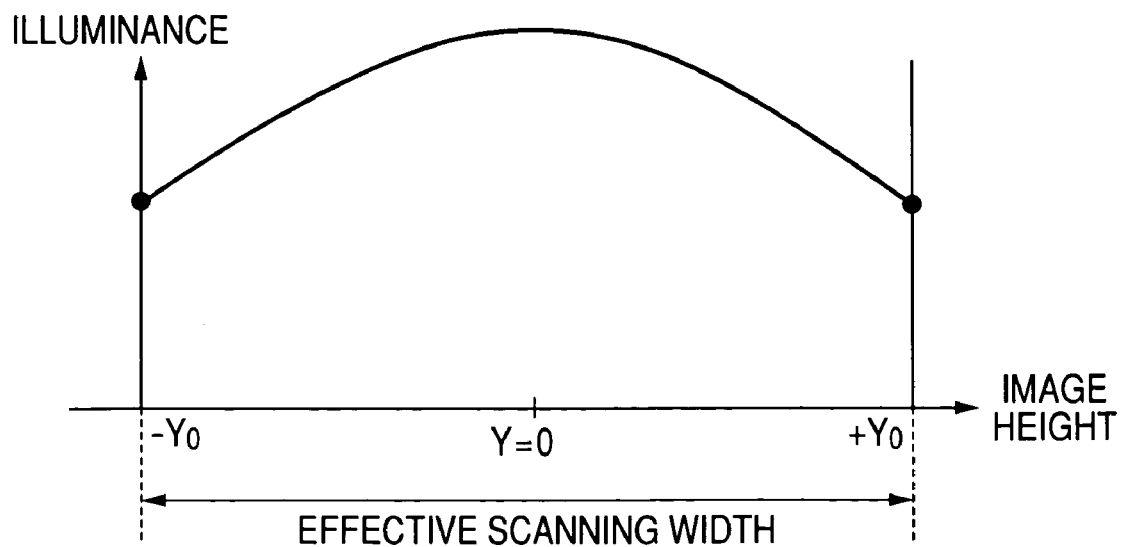
FIG. 12 shows a conventional illuminance distribution in the case where light amount decreasing exists.
Figure 13:
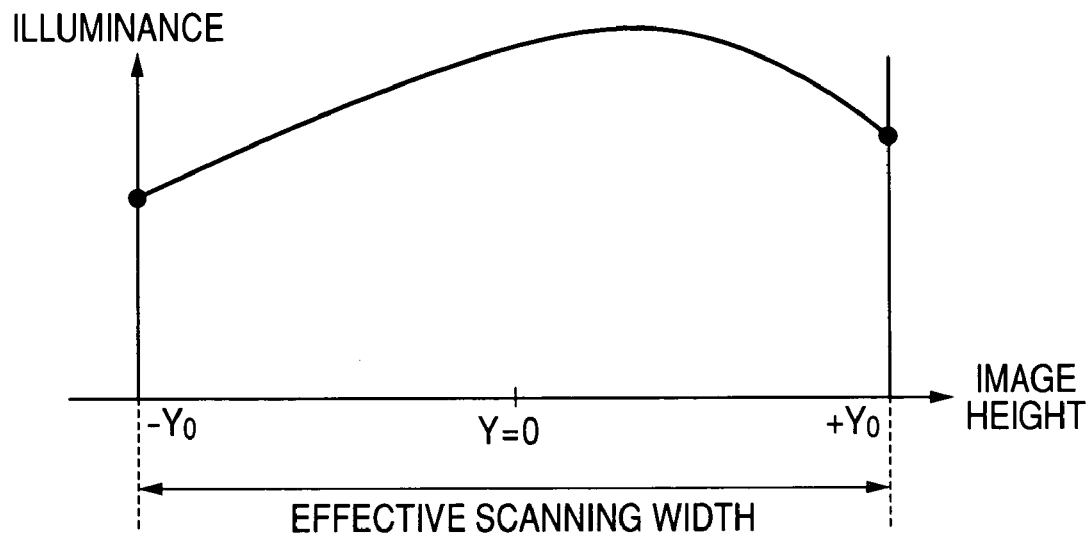
FIG. 13 shows a conventional illuminance distribution in the case where light amount decreasing and a gradient exist.

FIG. 11E shows illuminance distributions 14*ai* and 14*bi* in the case where the emission light amounts of the lasers A and B are independently controlled in the manner shown in FIG. 11C in this embodiment.

As can be seen from FIG. 11E, the illuminance distributions 14*ai* and 14*bi* of the lasers A and B are approximately the same at every image height and are uniformly corrected, therefore, when the multi-OFS in this embodiment is applied to an image forming apparatus, the unevenness in density of image due to the light amount decrease and the unevenness in density of image due to the inter-light-beams illuminance difference are reduced, which makes it possible to obtain a favorable image.

That is, according to this embodiment, merely by performing the simple drive current control and light beam emission direction adjustment in a conventional multi-OFS, it becomes possible to reduce the unevenness in density of image and to obtain a favorable image.

It should be noted here that in this embodiment, a position, at which the light intensity of the light beam emitted from the laser A is the maximum in the main scanning section, and the center position of the effective scanning range in the main scanning section on the surface to be scanned are adjusted so as to coincide with each other. However, the present invention is not limited to this. Adjustment may be made so that a position, at which the light intensity of the light beam emitted from the laser B is the maximum in the main scanning section, and the center position of the effective scanning range in the main scanning section on the surface to be scanned coincide with each other.

It should be noted here that in each of the first to third embodiments, the number of light emission portions (lasers) is set at two for ease of explanation, but the present invention is not limited to this and the number of light emission portions (lasers) may be changed to three or more, for instance.

When the emission light amount is controlled for each of three or more light emission portions (lasers) so that the illuminances of three or more light beams become the same at every image height on the surface to be scanned, it is preferable that the illuminance difference between the three or more light beams on the surface to be scanned be 10% or less at every image height.

Here, a situation where the illuminance difference between three or more light beams is 10% or less refers to that the maximum value of the illuminance difference between a light beam having the highest illuminance and a light beam having the lowest illuminance among the three or more light beams at the same image height at every image height on a surface to be scanned is 10% or less.

When the illuminance difference between two light beams is 10% or less, suppression to a level at which the unevenness in density of image is hard to recognize with unaided eyes is possible.

In addition, as a result of recent increase in image definition, the unevenness in density of image becomes easier to recognize. Consequently, it is more preferable that the illuminance difference between three or more light beams on the surface to be scanned be 1% or less at every image height.

In the first to third embodiments, the two light emission portions (lasers) 14*a* and 14*b* are spaced apart from each other in the main scanning direction and the sub-scanning direction, but the present invention is not limited to this.

In the case of a multi-OFS, the present invention is also applicable to a configuration where the two light emission portions (lasers) 14*a* and 14*b* are spaced apart from each other only in the sub-scanning direction.

Even in the configuration where the two light emission portions (lasers) 14*a* and 14*b* are spaced apart from each other only in the sub-scanning direction, the problem shown in FIG. 14 occurs and it is possible to reduce variations of the illuminances 14*ai* and 14*bi* of the lasers A and B at the same image height on the surface to be scanned with the solving means according to the present invention where the emission light amounts of the two light emission portions 14*al* and 14*bl* at the same scanning angle are changed in a partial region of a whole scanning angle region.

The present invention is also applicable to a configuration where three or more light emission portions are spaced apart from each other only in the sub-scanning direction.

Also, in each of the first to third embodiments, a construction has been described in which the emission light amount control is performed using the control means for controlling the laser drive current amount. However, the present invention is not limited to this and a construction including control means for controlling an emission time per dot may be used, for instance.

Also, in each of the first to third embodiments, the light source means having the multiple light emission portions is constructed using the monolithic-multi-beam semiconductor laser. However, the present invention is not limited to this and a construction where multiple light beams emitted from multiple light sources that are constructed independently of each other are synthesized by light beam synthesizing means, such as a prism, may be used, for instance.

Also, in the second embodiment, the illuminance distribution compensating optical element 3' is constructed using the aperture where the width in the sub-scanning direction of the opening shape of the opening plate increases in the direction from the center portion to the end portions with respect to the main scanning direction. However, the present invention is not limited to this and a construction including an absorber, whose absorptance is reduced in the direction from the center portion to the end portions with respect to the main scanning direction, or a turn back mirror, whose reflectance increases as the image height Y changes from "0" to the maximum image height, may be used, for instance.

Also; in each of the second and third embodiments, the adjusting means (adjusting mechanism) for adjusting the laser intensity center positions on the deflecting surface with respect to the main scanning direction is constructed using the mechanism that rotates the monolithic multi-beam semiconductor laser serving as the light source means with respect to the main scanning direction. However, the present invention is not limited to this and a construction including a mechanism that shifts or rotates any of the optical elements of the incident optical system, such as the collimator lens, in the main scanning direction may be used, for instance.

Also, in each embodiment, the imaging optical system is constructed using the two lenses, but the present invention is not limited to this and the imaging optical system may be constructed using one lens or three or more lenses, for instance. Also, the imaging optical system may be constructed using a diffraction optical element or a curved mirror.

<Image Forming Apparatus>

Figure 19:
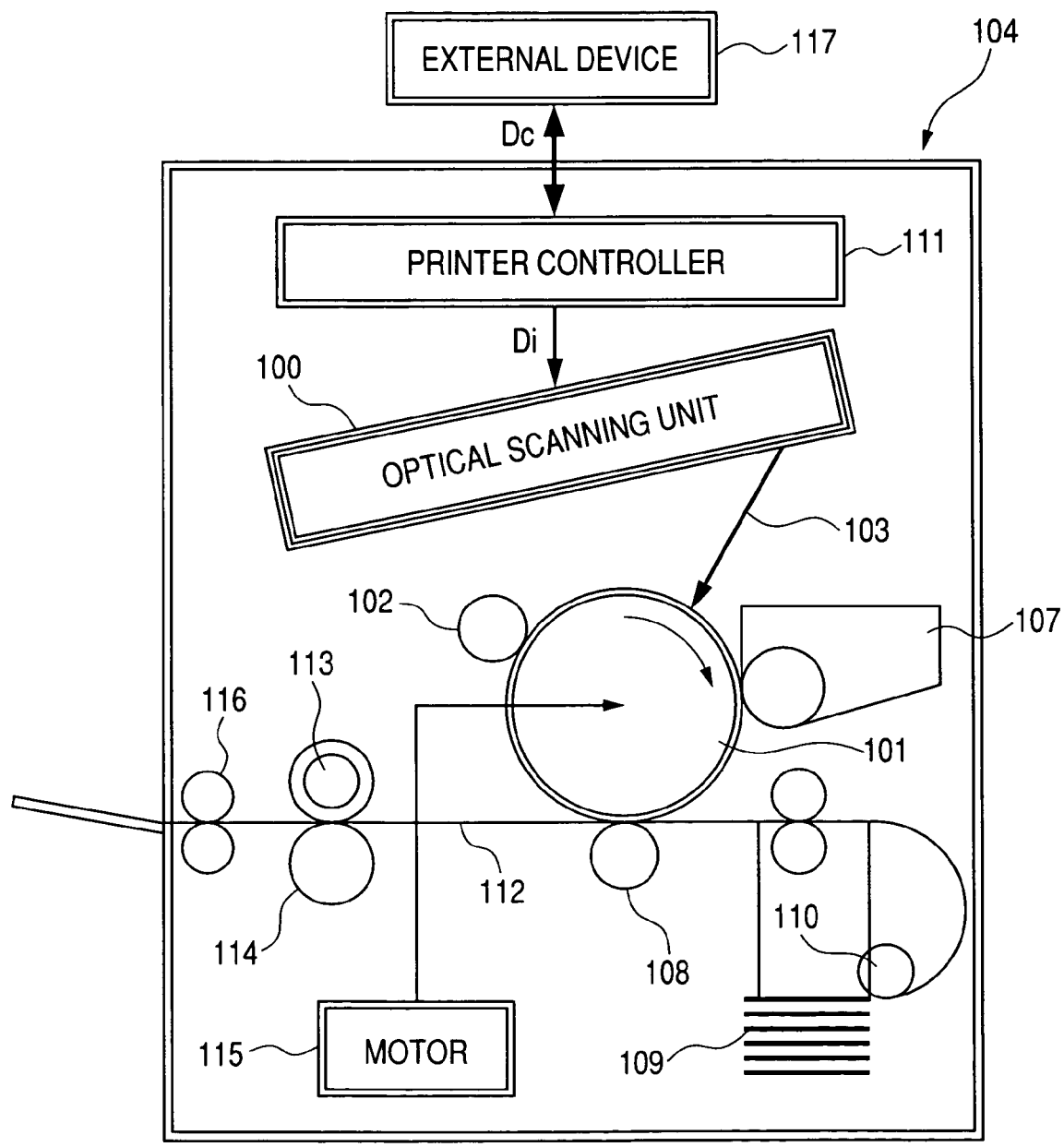
FIG. 19 is a sub-scanning sectional view showing an embodiment of the image forming apparatus according to the present invention.

FIG. 19 is a main portion sectional view taken in the sub-scanning direction of an image forming apparatus according to an embodiment of the present invention. In the drawing, reference numeral 104 denotes the image forming apparatus. Into the image forming apparatus 104, code data Dc is inputted from an external device 117 such as a personal computer. The code data Dc is converted into image data (dot data) Di by a printer controller 111 in the apparatus. The image data Di is inputted into an optical scanning unit 100 having the construction described in any of the first to third embodiments. Then, a light beam 103 modulated in accordance with the image data Di is emitted from the optical scanning unit 100 and a photosensitive surface of a photosensitive drum 101 is scanned with the light beam 103 in the main scanning direction.

The photosensitive drum 101 serving as an electrostatic latent image bearing member (photosensitive member) is rotated by a motor 115 in a clockwise direction. As a result of the rotation, the photosensitive surface of the photosensitive drum 101 moves with respect to the light beam 103 in the sub-scanning direction orthogonal to the main scanning direction. A charging roller 102 that uniformly charges the surface of the photosensitive drum 101 is provided above the photosensitive drum 101 so as to be abutted against the surface of the photosensitive drum 101. The light beam 103 used by the optical scanning unit 100 for scanning is irradiated onto the surface of the photosensitive drum 101 charged by the charging roller 102.

As described above, the light beam 103 has been modulated based on the image data Di and an electrostatic latent image is formed on the surface of the photosensitive drum 101 through the irradiation of the light beam 103. The electrostatic latent image is developed as a toner image by a developing device 107 provided so as to be abutted against the photosensitive drum 101 on a downstream side in the rotation direction of the photosensitive drum 101 with respect to the irradiation position of the light beam 103.

The toner image developed by the developing device 107 is transferred onto a sheet 112 serving as a material to be transferred by a transferring roller 108 provided below the photosensitive drum 101 so as to oppose the photosensitive drum 101. The sheet 112 is contained in a sheet cassette 109 provided on the front side of the photosensitive drum 101 (on the right side thereof in FIG. 19), but manual sheet feeding is also possible. A sheet feeding roller 110 is provided for an end portion of the sheet cassette 109 and feeds the sheet 112 in the sheet cassette 109 into a transport path.

The sheet 112, on which an unfixed toner image has been transferred in the manner described above, is further transported to a fixing device on the rear side of the photosensitive drum 101 (on the left side thereof in FIG. 19). The fixing device is composed of a fixing roller 113 including a fixing heater (not shown) and a pressurizing roller 114 provided so as to pressure-contact the fixing roller 113 and fixes the unfixed toner image on the sheet 112 transported from the transferring portion through pressurization and heating of the sheet 112 in a pressure-contact portion between the fixing roller 113 and the pressurizing roller 114. In addition, a delivery roller 116 is provided on the rear side of the fixing roller 113 and delivers the sheet 112 after the fixation to the outside of the image forming apparatus.

Although not shown in FIG. 19, the printer controller 111 performs not only the data conversion described above but also control of each portion, such as the motor 115, in the image forming apparatus, a polygon motor in the optical scanning unit described later, and the like.

The recording density of the image forming apparatus used in the present invention is not specifically limited. However, as the recording density is increased, the required image quality become higher, so the constructions in the first to third embodiments of the present invention becomes more effective in an image forming apparatus of 1,200 dpi or more.

<Color Image Forming Apparatus>

Figure 20:
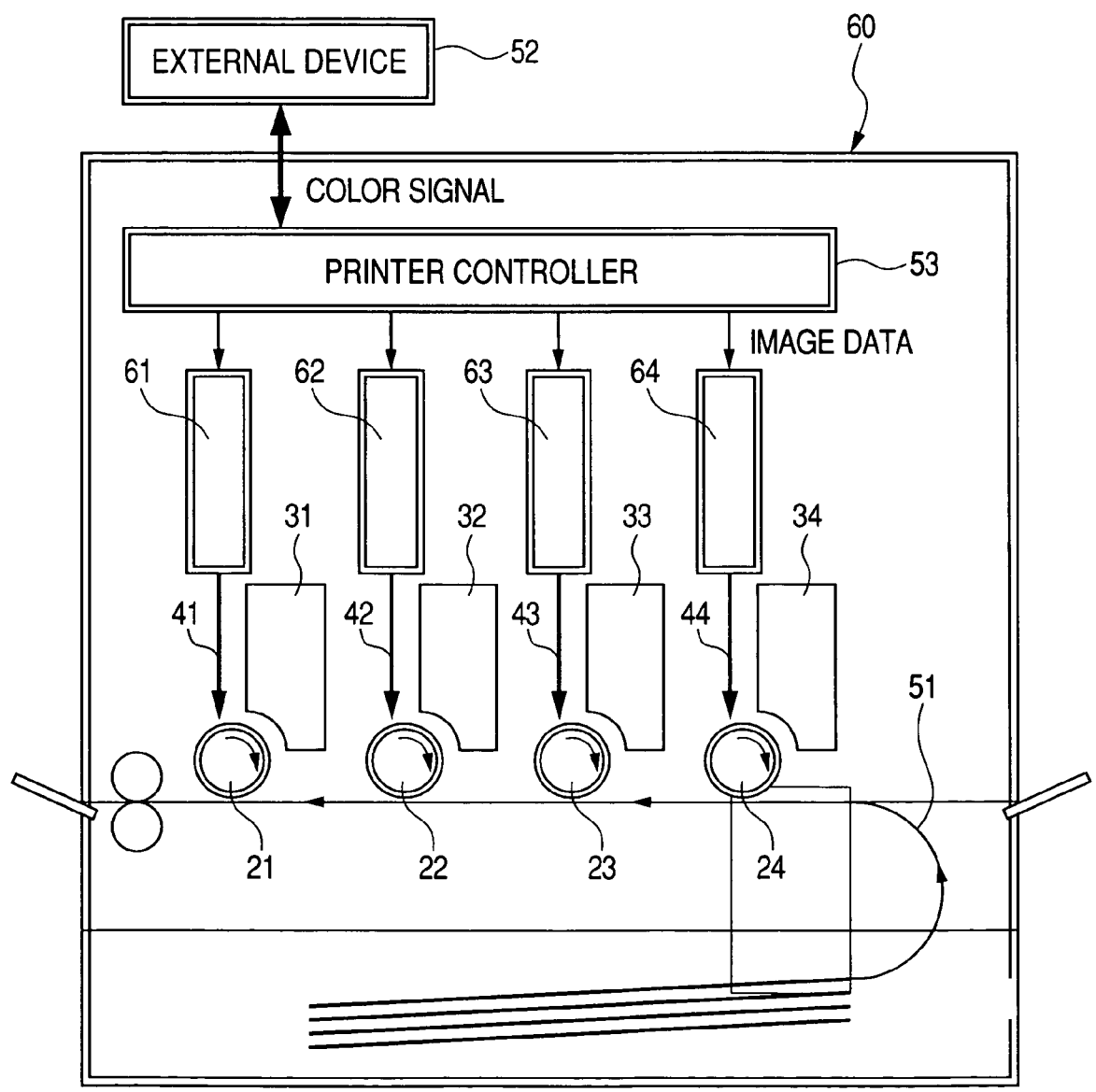
FIG. 20 is a main portion schematic diagram of a color image forming apparatus according to an embodiment of the present invention.

FIG. 20 is a main portion schematic diagram of a color image forming apparatus according to an embodiment of the present invention. This embodiment is a color image forming apparatus of tandem type where four optical scanning apparatuses are arranged side by side and respectively record image information on photosensitive drum surfaces that are image bearing members in parallel. In FIG. 20, reference numeral 60 denotes the color image forming apparatus, reference numerals 61, 62, 63, and 64 each indicate an optical scanning apparatus having any of the constructions described in the first to third embodiments, reference numerals 21, 22, 23, and 24 each represent a photosensitive drum serving as an image bearing member, reference numerals 31, 32, 33, and 34 each denote a developing device, and reference numeral 51 indicates a conveyor belt.

In FIG. 20, into the color image forming apparatus 60, color signals for respective colors of R (red), G (green), and B (blue) are inputted from an external device 52 such as a personal computer. The color signals are converted into image data (dot data) for respective colors of C (cyan), M (magenta), Y (yellow), and B (black) by the printer controller 53 in the apparatus. The image data is inputted into the optical scanning apparatuses 61, 62, 63, and 64, respectively. Then, light beams 41, 42, 43, and 44 modulated in accordance with the respective image data are emitted from the optical scanning apparatuses and the photosensitive surfaces of the photosensitive drums 21, 22, 23, and 24 are scanned with the light beams in the main scanning direction.

In the color image forming apparatus in this embodiment, the four optical scanning apparatuses (61, 62, 63, and 64) that respectively correspond to the colors of C (cyan), M (magenta), Y (yellow), and B (black) are arranged side by side and respectively record the image signals (image information) on the surfaces of the photosensitive drums 21, 22, 23, and 24 in parallel, thereby printing a color image at high speed.

As described above, the color image forming apparatus in this embodiment forms latent images for the respective colors on the respective surfaces of the photosensitive drums 21, 22, 23, and 24 using the light beams emitted from the four optical scanning apparatuses 61, 62, 63, and 64 based on the respective image data. Following this, multiplex transfer onto a recording material is performed, thereby forming one full-color image.

For instance, the external device 52 may be a color image reading apparatus provided with a CCD sensor. In this case, a color digital copying machine is formed by the color image reading apparatus and the color image forming apparatus 60.

This application claims priority from Japanese Patent Application No. 2004-164643 filed on Jun. 2, 2004, which is hereby incorporated by reference herein.

What is claimed is:

1. A multi-beam optical scanning apparatus comprising:
    light source means including a plurality of light emission portions;
    a light deflector including a deflecting surface;
    an incident optical system in which a plurality of light beams emitted from the plurality of light emission portions is made incident on the deflecting surface of the light deflector with a width in a main scanning direction wider than that of the deflecting surface;
    an imaging optical system that images the plurality of light beams reflected by the light deflector on a surface to be scanned; and
    control means for independently controlling emission light amount of each of the plurality of light emission portions,
    wherein when the emission light amount of each of the plurality of light emission portions is controlled so that illuminances of the plurality of light beams become same at every image height on the surface to be scanned, the control means controls emission light amounts of the plurality of light emission portions at a maximum scanning angle so as to be different from one another.

2. A multi-beam optical scanning apparatus according to claim 1,
    wherein when the emission light amount of each of the plurality of light emission portions is controlled so that illuminances of the plurality of light beams become same at every image height on the surface to be scanned, the control means controls emission light amounts of the plurality of light emission portions at a same scanning angle in a partial region of a whole scanning angle region so as to be different from one another.

3. A multi-beam optical scanning apparatus according to claim 1,
    wherein the control means controls the emission light amount of each of the plurality of light emission portions so that illuminances of the plurality of light beams on the surface to be scanned are linearly-changed in accordance with the image height.

4. A multi-beam optical scanning apparatus according to claim 1,
    wherein the control means controls the emission light amount of each of the plurality of light emission portions so that illuminances of the plurality of light beams on the surface to be scanned are non-linearly changed in accordance with the image height.

5. A multi-beam optical scanning apparatus according to claim 1, further comprising:
    an illuminance distribution compensating optical element provided in an optical path between the light source means and the surface to be scanned and for correcting an illuminance distribution in one scanning line on the surface to be scanned,
    wherein the illuminance distribution compensating optical element corrects an illuminance of the scanning line on the surface to be scanned so as to increase in the main scanning direction from a center portion to end portions.

6. A multi-beam optical scanning apparatus according to claim 1, further comprising:
    adjusting means for adjusting each position at which a light intensity of the respective light beams emitted from the plurality of light emission portions in a main scanning section becomes maximum on the deflecting surface of the light deflector,
    wherein the adjusting means adjusts so that a position, at which the light intensity of the light beam emitted from the plurality of light emission portions in the main scanning section is maximum on the deflecting surface, and a center position of an effective scanning range in the main scanning section on the surface to be scanned coincide with each other.

7. A multi-beam optical scanning apparatus according to claim 1, further comprising:
    adjusting means for adjusting each position at which a light intensity of the respective light beams emitted from the plurality of light emission portions in a main scanning section becomes maximum on the deflecting surface of the light deflector,
    wherein the adjusting means adjusts so that a position, at which the light intensity of the light beam emitted from at least one light emission portion among the plurality of light emission portions in the main scanning section becomes maximum on the deflecting surfaces and a center position of an effective scanning range in the main scanning section on the surface to be scanned coincide with each other.

8. A multi-beam optical scanning apparatus according to claim 1,
    wherein the plurality of light emission portions are spaced apart from one another in the main scanning direction and the sub-scanning direction.

9. A multi-beam optical scanning apparatus according to claim 1,
    wherein the plurality of light emission portions are spaced apart from one another in the sub-scanning direction.

10. An image forming apparatus comprising:
    the multi-beam optical scanning apparatus according to claim 1;
    a photosensitive member disposed in front of the surface to be scanned;
    a developing device for developing an electrostatic latent image formed on the photosensitive member by a light beam with which scanning is performed by the multi-beam optical scanning apparatus as a toner image;
    a transferring device for transferring the developed toner image to a material to be transferred; and
    a fixing device for fixing the transferred toner image to the material to be transferred.

11. An image forming apparatus comprising:
    the multi-beam optical scanning apparatus according to claim 10; and
    a printer controller for converting code data inputted from an external device into an image signal and inputting the image signal into the multi-beam optical scanning apparatus.

12. A color image forming apparatus comprising:
a plurality of multi-beam optical scanning apparatuses according to claim 1; and
a plurality of image bearing members for forming images in mutually different colors, each of the plurality of image bearing members disposed on the respective surfaces to be scanned of the plurality of multi-beam optical scanning apparatuses.

13. A color image forming apparatus according to claim 12, further comprising:
a printer controller for converting color signals inputted from an external device into image data for different colors and inputting the image data into the respective multi-beam optical scanning apparatuses.

* * * * *

UNITED STATES PATENT AND TRADEMARK OFFICE
CERTIFICATE OF CORRECTION

PATENT NO. : 7,271,942 B2
APPLICATION NO. : 11/138479
DATED : September 18, 2007
INVENTOR(S) : Yuichi Tomioka It is certified that error appears in the above-identified patent and that said Letters Patent is hereby corrected as shown below:

COLUMN 1

Line 23, "optically" should read --is optically--.

COLUMN 2

Line 9, "with-changes" should read --with changes--; and
Line 21, "perpendicular-to" should read --perpendicular to--.

COLUMN 3

Line 9, "interval di" should read --interval d1'--; and
Line 20, "14bi n" shoud read -- 14b in--.

COLUMN 4

Line 10, "coefficient" should read --coefficient.--; "illuminance" should read --Illuminance--; and
Line 13, "has" should read --have--.

COLUMN 5

Line 66, "light-amount" should read --light amount--.

COLUMN 7

Line 5, "potions" should read --portions--;
Line 18, "become" should read --becomes--; and
Line 24, "and to increase" should read --thereby increasing--.

COLUMN 8

Line 25, "surface-to" should read --surface to--;
Line 53, "the-center" should read --the center--; and
Line 58, "optically" should read --which optically--.

UNITED STATES PATENT AND TRADEMARK OFFICE
CERTIFICATE OF CORRECTION

PATENT NO.       : 7,271,942 B2
APPLICATION NO.  : 11/138479
DATED            : September 18, 2007
INVENTOR(S)      : Yuichi Tomioka It is certified that error appears in the above-identified patent and that said Letters Patent is hereby corrected as shown below:

COLUMN 10

Line 29, "$0.9 \leq |B1'/A1'| \leq 1.1, 0.9 \leq |B2'/A2'| \leq 1.1,$ (1)" should read
--$0.9 \leq |B1'/A1'| \leq 1.1, 0.9 \leq |B2'/A2'| \leq 1.1,$ (1)'--.

COLUMN 11

Line 19, "that" should read --to one in which--; and
Line 38, "means, however," should read --means. However,--.

COLUMN 13

Line 3, "main," should read --main--;
Line 11, "Y=0," should read --Y=0.--;
Line 14, "as-shown" should read --as shown--; and
Line 33, "lasers and B" should read --lasers A and B--.

COLUMN 17

Line 18, "to-simultaneously" should read --to simultaneously--;
Line 28, "corrected," should read --corrected.--; and
Line 29, "therefore," should read --Therefore,--.

COLUMN 18

Line 1, "that" should be deleted;
Line 46, "monolithic-multi-beam" should read --monolithic multi-beam--; and
Line 64, "Also;" should read --Also,--.

COLUMN 20

Line 20, "become" should read --becomes--;
Line 21, "becomes" should read --become--.

COLUMN 21

Line 51, "linearly-" should read --linearly--.

UNITED STATES PATENT AND TRADEMARK OFFICE
CERTIFICATE OF CORRECTION

PATENT NO. : 7,271,942 B2
APPLICATION NO. : 11/138479
DATED : September 18, 2007
INVENTOR(S) : Yuichi Tomioka It is certified that error appears in the above-identified patent and that said Letters Patent is hereby corrected as shown below:

COLUMN 22

Line 32, "surfaces" should read --surface,--; and
    Line 62, "claim 10;" should read --claim 1;--.

Signed and Sealed this

Twentieth Day of May, 2008

JON W. DUDAS
*Director of the United States Patent and Trademark Office*